US011997052B2

(12) United States Patent
Abotabl et al.

(10) Patent No.: US 11,997,052 B2
(45) Date of Patent: May 28, 2024

(54) INTERLEAVED UPLINK-DOWNLINK TRANSMISSIONS IN FULL-DUPLEX USING UNLICENSED RESOURCES

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/387,930

(22) Filed: Jul. 28, 2021

(65) Prior Publication Data
US 2022/0109549 A1   Apr. 7, 2022

Related U.S. Application Data

(60) Provisional application No. 63/087,858, filed on Oct. 5, 2020.

(51) Int. Cl.
*H04L 5/00* (2006.01)
*H04L 5/14* (2006.01)

(52) U.S. Cl.
CPC ............. *H04L 5/14* (2013.01); *H04L 5/0005* (2013.01)

(58) Field of Classification Search
CPC ..... H04L 5/14; H04L 5/22; H04L 5/02; H04L 5/0005; H04L 5/0003; H04L 5/0001
See application file for complete search history.

(56) References Cited

U.S. PATENT DOCUMENTS

| | | | |
|---|---|---|---|
| 2014/0146696 A1* | 5/2014 | Lin ........................... | H04L 5/14 370/252 |
| 2019/0052425 A1* | 2/2019 | Kim ...................... | H04L 5/0064 |
| 2019/0239057 A1* | 8/2019 | Hwang ................. | H04L 5/1469 |
| 2020/0037354 A1* | 1/2020 | Li ...................... | H04W 74/0808 |
| 2020/0146055 A1* | 5/2020 | Lei ...................... | H04J 13/0062 |

(Continued)

FOREIGN PATENT DOCUMENTS

| | | | | |
|---|---|---|---|---|
| CN | 108809615 | * | 11/2018 | |
| CN | 108809615 A | * | 11/2018 | ............... H04B 3/32 |

(Continued)

*Primary Examiner* — Phong La
(74) *Attorney, Agent, or Firm* — Polsinelli

(57) ABSTRACT

Apparatus, methods, and computer-readable media for facilitating interleaved uplink-downlink transmissions in full-duplex using unlicensed resources are disclosed herein. An example method for wireless communication of a user equipment (UE) includes receiving, from a base station, an indication of an interleaved configuration, the interleaved configuration corresponding to a full-duplex configuration including a first gap duration following a downlink transmission and a second gap duration following an uplink transmission. The example method also includes configuring at least one of uplink transmissions or downlink transmissions based on the indication. Additionally, the example method includes communicating with the base station via the interleaved configuration, communications with the base station including at least one of the uplink transmissions or the downlink transmissions.

30 Claims, 15 Drawing Sheets

(56) References Cited

U.S. PATENT DOCUMENTS

| | | | |
|---|---|---|---|
| 2020/0358576 A1* | 11/2020 | Zarifi | H04L 5/0053 |
| 2021/0022006 A1* | 1/2021 | Sun | H04W 72/23 |
| 2021/0152418 A1* | 5/2021 | Abdelghaffar | H04L 5/0007 |
| 2021/0235463 A1* | 7/2021 | Xu | H04J 11/0023 |
| 2022/0060265 A1* | 2/2022 | Xu | H04W 24/08 |
| 2022/0109549 A1* | 4/2022 | Abotabl | H04W 72/0446 |
| 2022/0182160 A1* | 6/2022 | Su | H04L 27/2691 |
| 2022/0191838 A1* | 6/2022 | Huang | H04L 5/14 |
| 2022/0210679 A1* | 6/2022 | Cirik | H04L 5/0053 |

FOREIGN PATENT DOCUMENTS

| | | | | |
|---|---|---|---|---|
| CN | 107135031 B | * | 4/2021 | H04B 7/26 |
| JP | 2022009449 A | * | 1/2022 | H04L 1/1809 |
| WO | WO-2021159626 A1 | * | 8/2021 | |

* cited by examiner

Full-duplex Base Station + Half-duplex UE

Full-duplex Base Station + Full-duplex UE

Full-duplex UE only (with multiple TRPs)

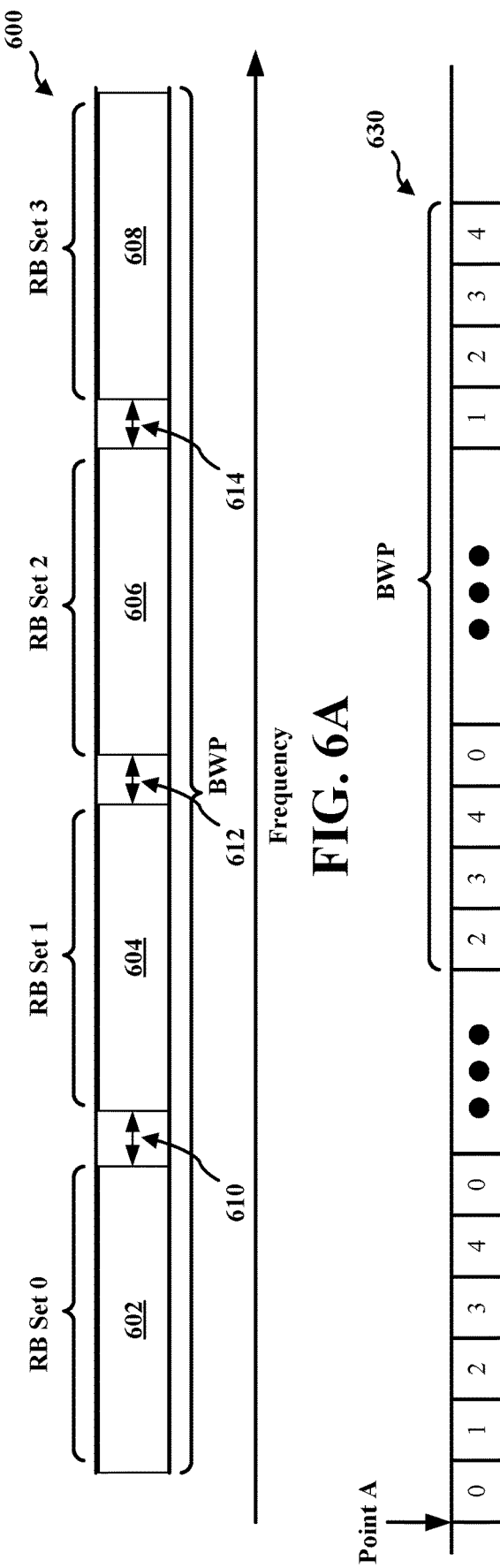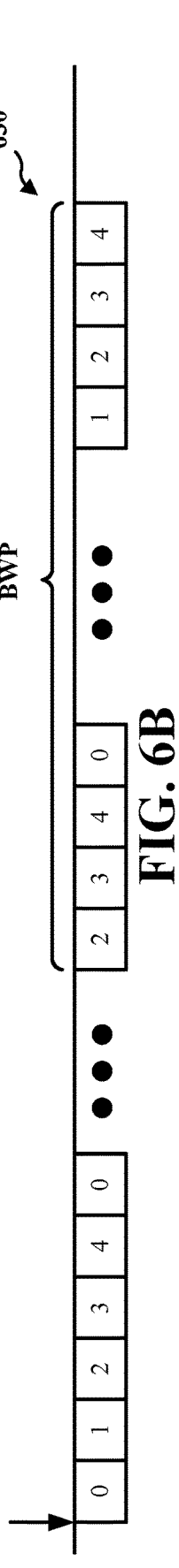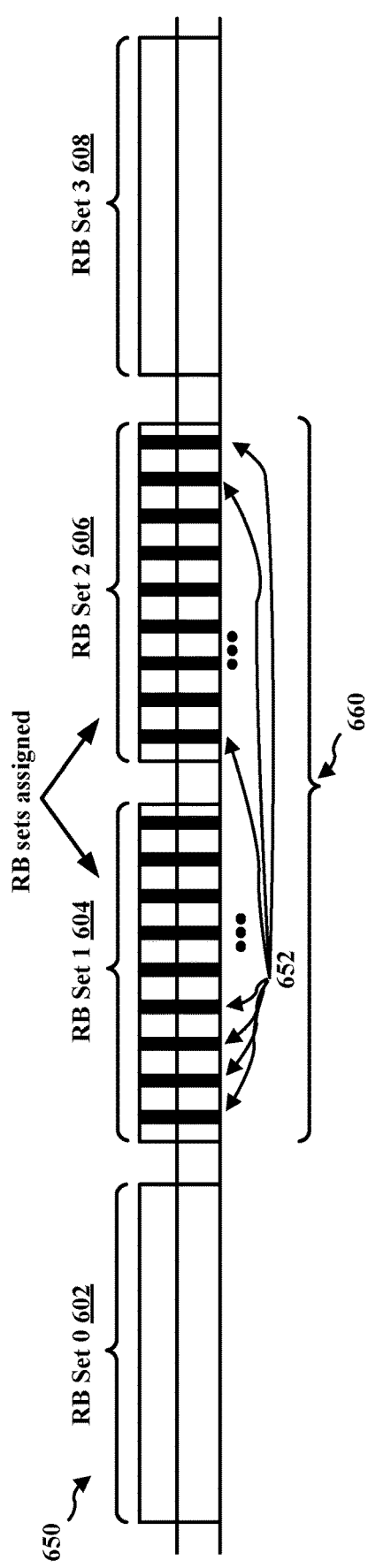
FIG. 6A
FIG. 6B
FIG. 6C

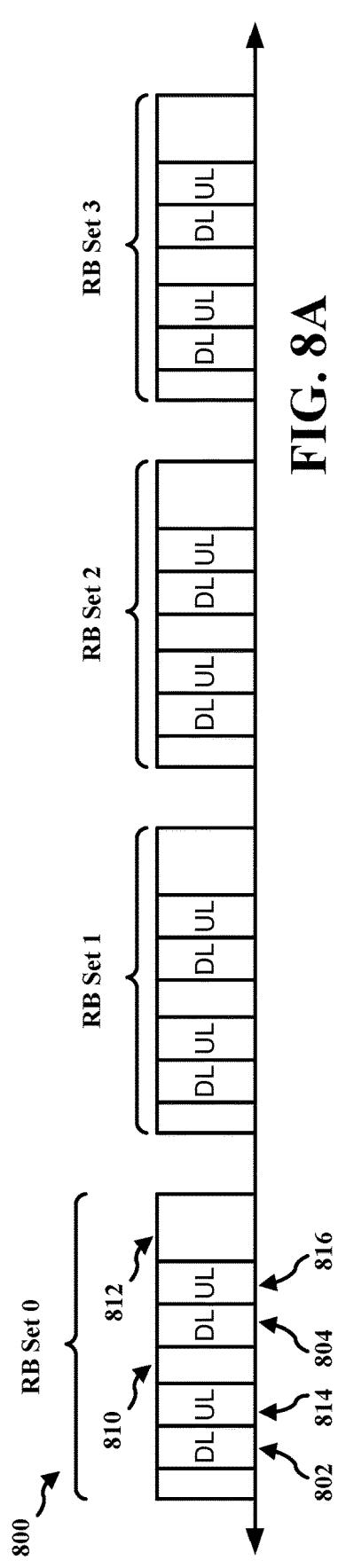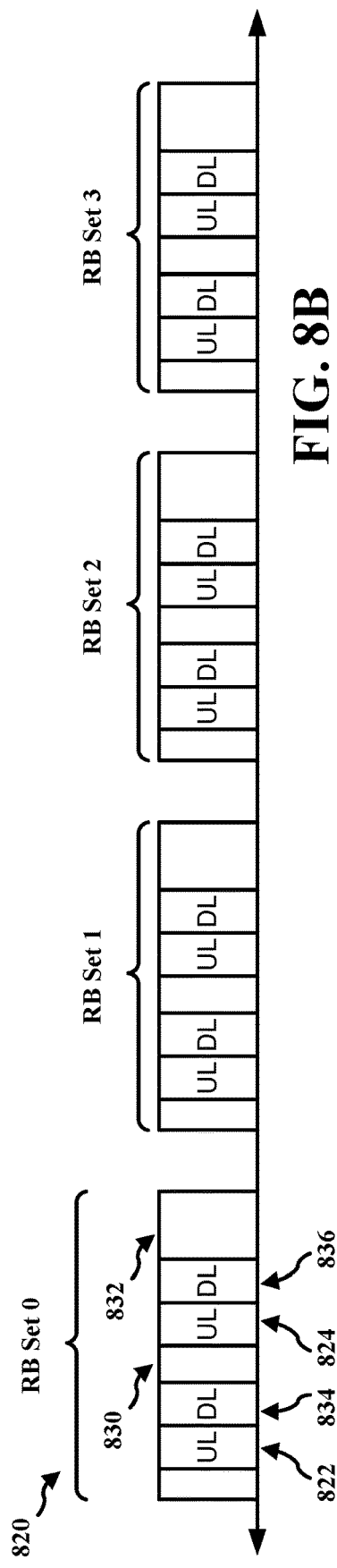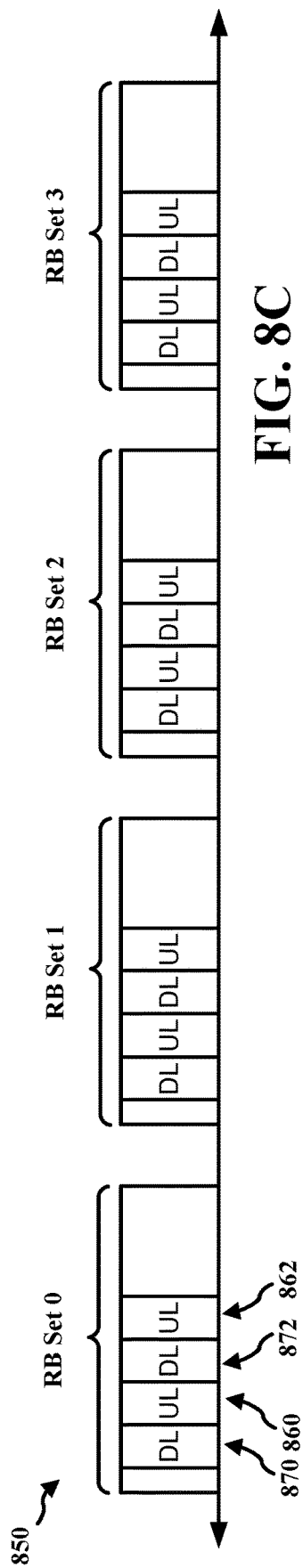

INTERLEAVED UPLINK-DOWNLINK TRANSMISSIONS IN FULL-DUPLEX USING UNLICENSED RESOURCES

CROSS REFERENCE TO RELATED APPLICATION(S)

This application claims the benefit of and priority to U.S. Provisional Application Ser. No. 63/087,858, entitled "Interleaved Uplink-Downlink Transmissions in Full-Duplex Using Unlicensed Resources," and filed on Oct. 5, 2020, which is expressly incorporated by reference herein in its entirety.

TECHNICAL FIELD

The present disclosure relates generally to communication systems, and more particularly, to wireless communications including full-duplex communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus may receive, from a base station, an indication of an interleaved configuration. The interleaved configuration may correspond to a full-duplex configuration including a first gap duration following a downlink transmission and a second gap duration following an uplink transmission. The example apparatus may also configure at least one of uplink transmissions or downlink transmissions based on the indication. Additionally, the example apparatus may communicate with the base station via the interleaved configuration, communications with the base station including at least one of the uplink transmissions or the downlink transmissions. In some examples, the interleaved configuration may correspond to a sub-band full-duplex configuration. In some examples, the interleaved configuration may correspond to an in-band full-duplex configuration.

In another aspect of the disclosure, a method, a computer-readable medium, and an apparatus are provided for wireless communication at a base station. An example apparatus may transmit, to a UE, an indication of an interleaved configuration. The interleaved configuration may correspond to a full-duplex configuration including a first gap duration following a downlink transmission and a second gap duration following an uplink transmission. The example apparatus may also configure at least one of uplink transmissions or downlink transmissions based on the interleaved configuration. Additionally, the example apparatus may communicate with the UE via the interleaved configuration, communications with the UE including at least one of the uplink transmissions or the downlink transmissions. In some examples, the interleaved configuration may correspond to a sub-band full-duplex configuration. In some examples, the interleaved configuration may correspond to an in-band full-duplex configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A depicts an example sequence of RB sets, in accordance with various aspects of the present disclosure.

FIG. 6B depicts a timeline including a sequence of PRB blocks, in accordance with various aspects of the present disclosure.

FIG. 6C depicts a diagram including resource blocks configured for uplink transmissions within a first RB set and a second RB set, in accordance with various aspects of the present disclosure.

FIG. 8A depicts a sequence including downlink gap durations with a duration of zero following downlink resources, in accordance with various aspects of the present disclosure.

FIG. 8B depicts a sequence including uplink gap durations with a duration of zero following uplink resources, in accordance with various aspects of the present disclosure.

FIG. 8C depicts a sequence including a joint interlaced pattern of uplink transmissions using uplink resources and downlink transmissions using downlink resources, in accordance with various aspects of the present disclosure.

DETAILED DESCRIPTION

Figure 1:
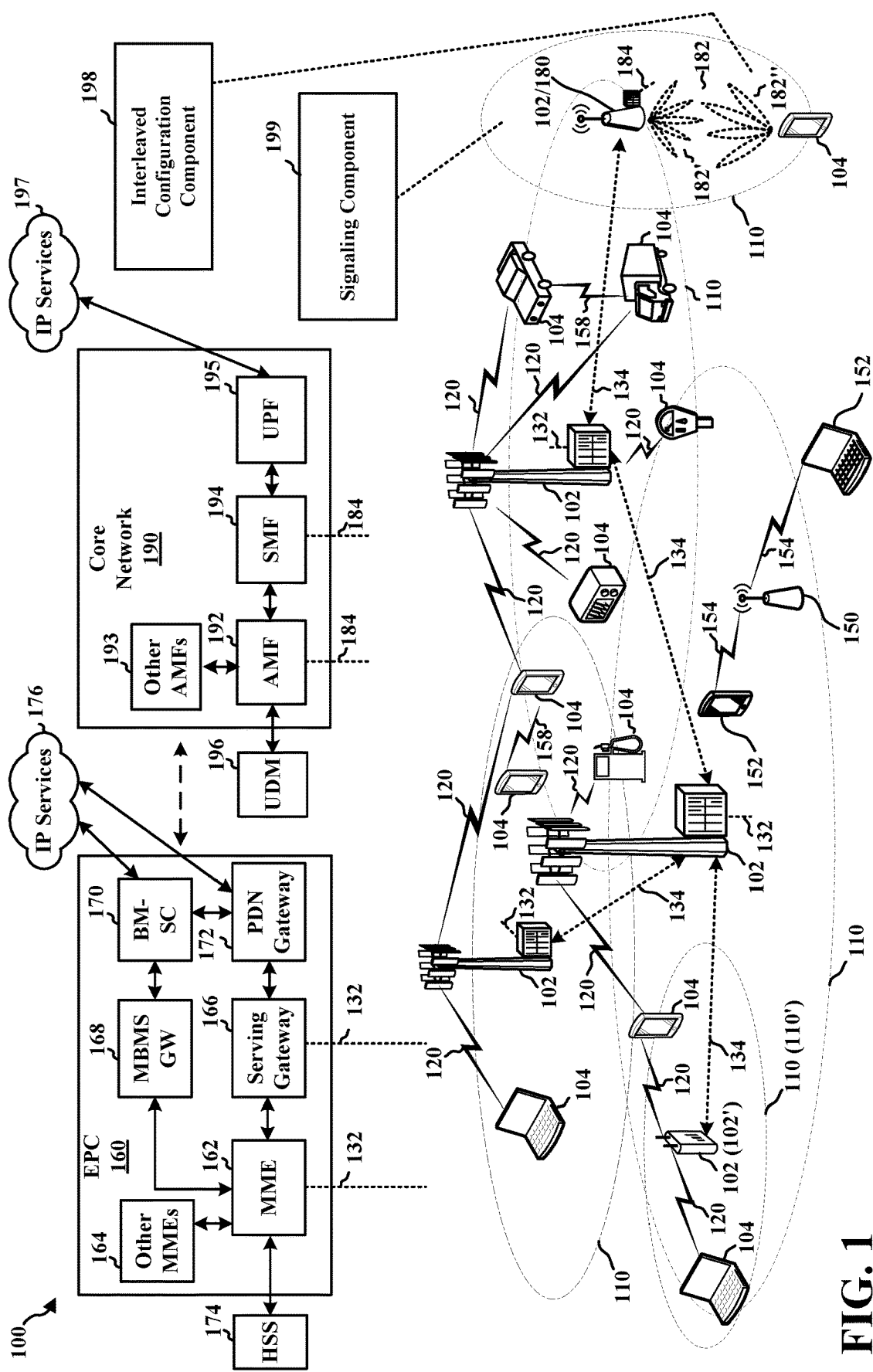
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Aspects disclosed herein provide an interleaved configuration of uplink transmissions and downlink transmissions in a full-duplex manner that improves spectral efficiency. For example, a base station may configure a UE with simultaneous uplink transmissions and downlink transmissions. In some examples, the uplink transmissions and the downlink transmissions may each be interlaced in the frequency domain in a configuration that satisfies sub-band full duplex operation. That is, the uplink transmissions and the downlink transmissions may be configured so that non-overlapping frequency resources are used for the respective transmissions while sharing a time resource. When providing the interleaved configuration, the base station may include an interlace assignment and a resource block (RB) set assignment. For example, the interleaved configured may include an interlace assignment allocating one or more RBs for uplink transmission and may include an RB set assignment indicating to which RB set(s) the interlace assignment applies.

FIG. 1 is a diagram illustrating an example of a wireless communications system and an access network 100 including base stations 102 and 180 and UEs 104. In certain aspects, a device in communication with a base station, such as a UE 104, may be configured to manage one or more aspects of wireless communication by applying an interleaved configuration for uplink transmissions and downlink transmissions when communicating using full-duplex. As an example, in FIG. 1, the UE 104 may include an interleaved configuration component 198 configured to receive, from a base station, an indication of an interleaved configuration. The interleaved configuration may correspond to a full-duplex configuration including a first gap duration following a downlink transmission and a second gap duration following an uplink transmission. The example interleaved configuration component 198 may also be configured to configure at least one of uplink transmissions or downlink transmissions based on the indication. Additionally, the example interleaved configuration component 198 may be configured to communicate with the base station via the interleaved configuration, communications with the base station including at least one of the uplink transmissions or the downlink transmissions. In some examples, the interleaved configuration may correspond to a sub-band full-duplex configuration. In some examples, the interleaved configuration may correspond to an in-band full-duplex configuration.

In another configuration, a base station, such as the base stations 102 and 180, may be configured to manage or more aspects of wireless communication by configuring a UE to apply an interleaved configuration for uplink transmissions and downlink transmissions when communicating using full-duplex. As an example, in FIG. 1, the base stations 102/180 may include a signaling component 199 configured to transmit, to a UE, an indication of an interleaved configuration. The interleaved configuration may correspond to a full-duplex configuration including a first gap duration following a downlink transmission and a second gap duration following an uplink transmission. The example signaling component 199 may also be configured to configure at least one of uplink transmissions or downlink transmissions based on the interleaved configuration. The example signaling component 199 may also be configured to communicate with the UE via the interleaved configuration, communications with the UE including at least one of the uplink transmissions or the downlink transmissions. In some examples, the interleaved configuration may correspond to a sub-band full-duplex configuration. In some examples, the interleaved configuration may correspond to an in-band full-duplex configuration.

Although the following description provides examples directed to 5G NR, the concepts described herein may be applicable to other similar areas, such as LTE, LTE-A, CDMA, GSM, and/or other wireless technologies, in which a UE and base station may be capable of full-duplex communication.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
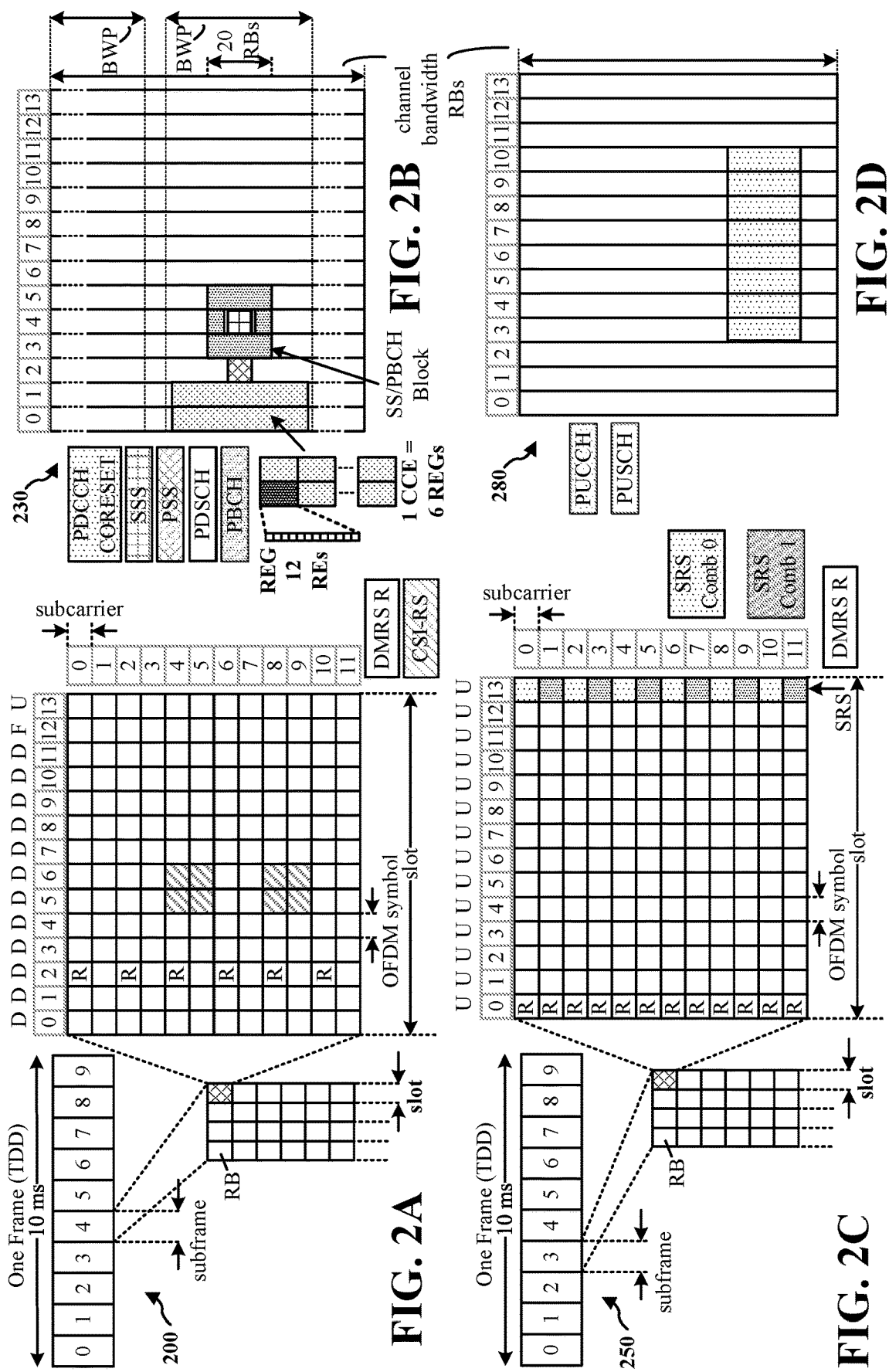
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
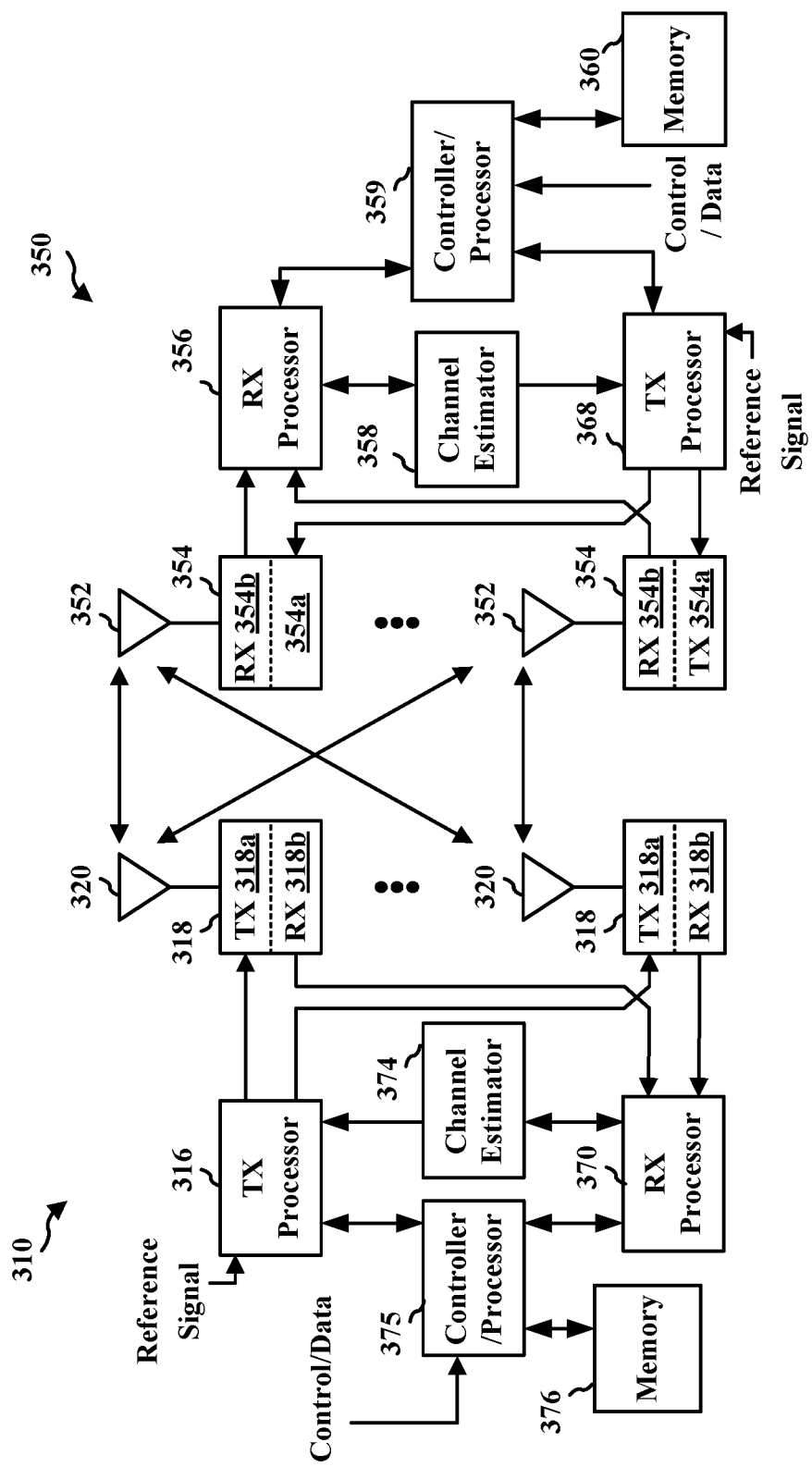
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318*a* and a receiver 318*b*, antennas 320, a receive processor (RX processor 370), a channel estimator 374, a controller/processor 375, and memory 376. The example UE 350 includes antennas 352, a transceiver 354 including a transmitter 354*a* and a receiver 354*b*, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the interleaved configuration component 198 of FIG. 1.

At least one of the TX processor 316, the RX processor 370, and the controller/processor 375 may be configured to perform aspects in connection with the signaling component 199 of FIG. 1.

Full-duplex communication enables a communication device to perform transmission and reception at a same time (e.g., using overlapping time resource). For example, a communication device (e.g., a UE or a base station) may use a first subset of frequency resources at a first time to receive a first transmission and a second subset of frequency resources at the first time to transmit a second transmission.

Figure 4A:
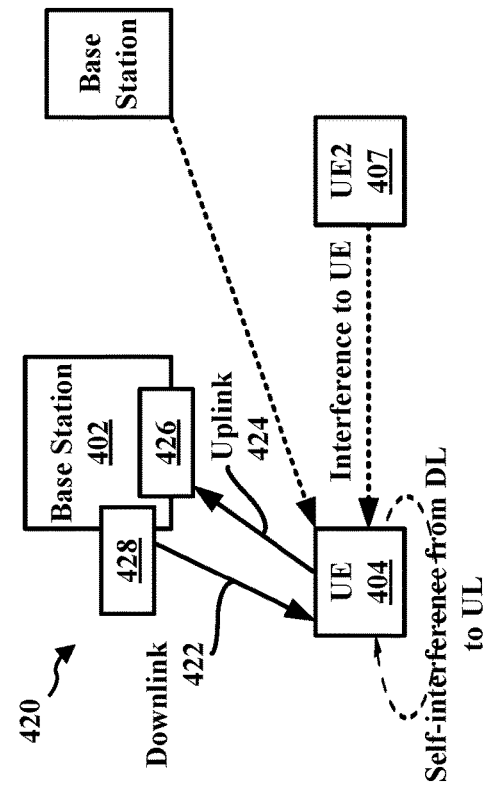
FIG. 4A illustrates a first example scenario including a base station that is capable of full-duplex communication, in accordance with various aspects of the present disclosure.
Figure 4B:
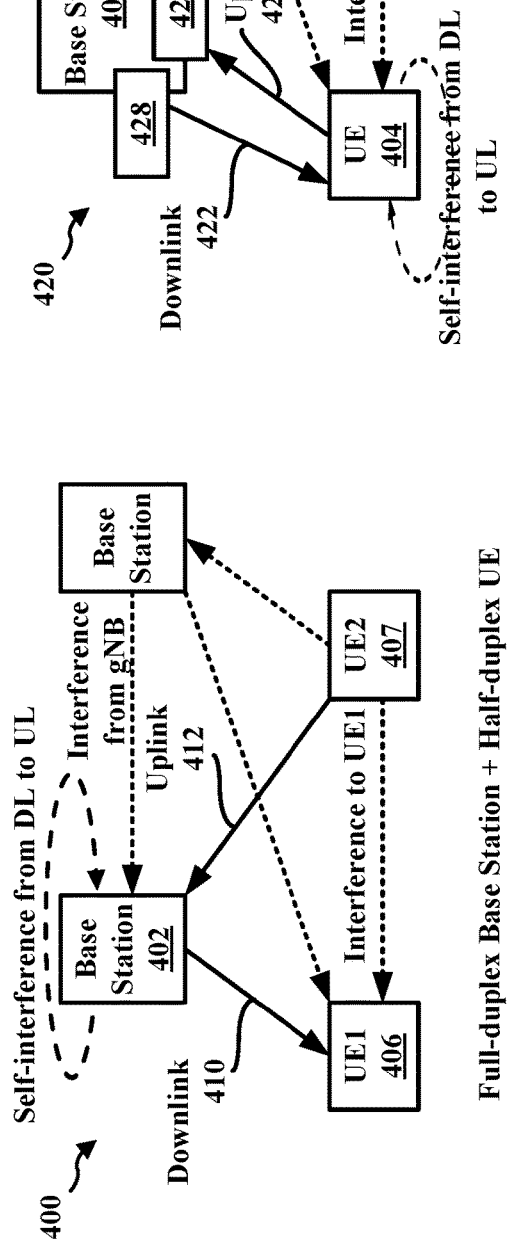
FIG. 4B illustrates a second example scenario in which a base station and a UE are both capable of full-duplex communication, in accordance with various aspects of the present disclosure.
Figure 4C:
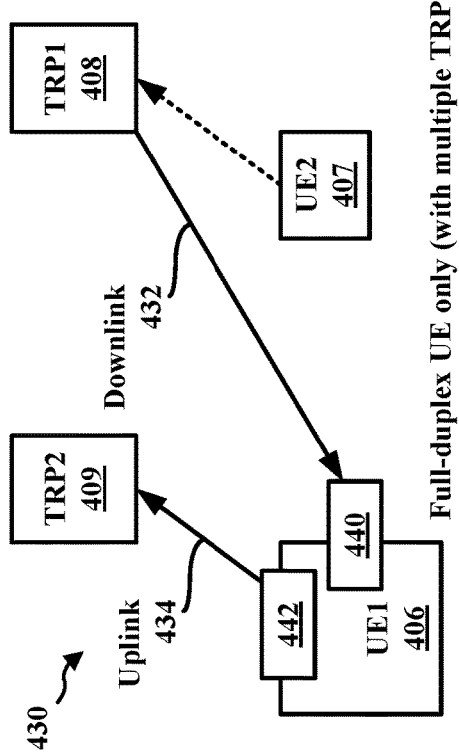
FIG. 4C illustrates a third example scenario in which a UE is capable of full-duplex communication, in accordance with various aspects of the present disclosure.

FIGS. 4A, 4B, and 4C illustrate example communication flows between wireless devices including at least one full-duplex capable communication device. For example, FIG. 4A illustrates a first example scenario 400 including a base station 402 that is capable of full-duplex communication.

FIG. 4B illustrates a second example scenario 420 in which the base station 402 and a UE 404 are both capable of full-duplex communication. FIG. 4C illustrates a third example scenario 430 in which the UE 404 is capable of full-duplex communication.

In the illustrated example of FIG. 4A, the base station 402 transmits a downlink transmission 410 to a first UE 406 while also receiving an uplink transmission 412 from a second UE 407. As shown in FIG. 4A, the first UE 406 and the second UE 407 are half-duplex (HD) UEs. For example, the UEs 406, 407 may be capable of either receiving a transmission or transmitting a transmission at any point in time. In the illustrated example of FIG. 4B, the UE 404 receives a downlink transmission 422 from the base station 402 while also transmitting an uplink transmission 424 to the base station 402. Additionally, the base station 402 transmits the downlink transmission 422 to the UE 404 while also receiving the uplink transmission 424 from the UE 404. In the illustrated example of FIG. 4C, the UE 404 receives a downlink transmission 432 from a first transmit reception point (TRP) 408 while also transmitting an uplink transmission 434 to a second TRP 409.

In some examples, to employ full-duplex communication, antennas or antenna panels at the communication device may be split to facilitate receiving and transmitting at the same time. For example, the UE 404 may include a first antenna panel 440 (or a first subset of antennas of an antenna panel) to facilitate receiving transmissions and a second antenna panel 442 (or a second subset of antennas of the antenna panel) to facilitate transmitting transmissions. In a similar manner, the base station 402 may include a first antenna panel 426 (or a first subset of antennas of an antenna panel) to facilitate receiving transmissions and a second antenna panel 428 (or a second subset of antennas of the antenna panel) to facilitate transmitting transmissions.

However, due to the simultaneous reception and transmission of signals, a full-duplex capable communication device may incur self-interference. For example, the signals received by the first antenna panel 440 of the UE 404 may propagate and interfere with the signals transmit by the second antenna panel 442 of the UE 404.

Figure 5C:
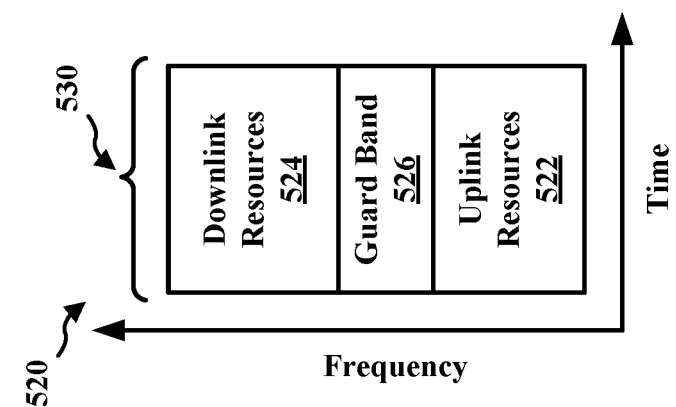
FIG. 5C depicts a timeline in which a full-duplex capable UE may employ SBFD, in accordance with various aspects of the present disclosure.
Figure 5B:
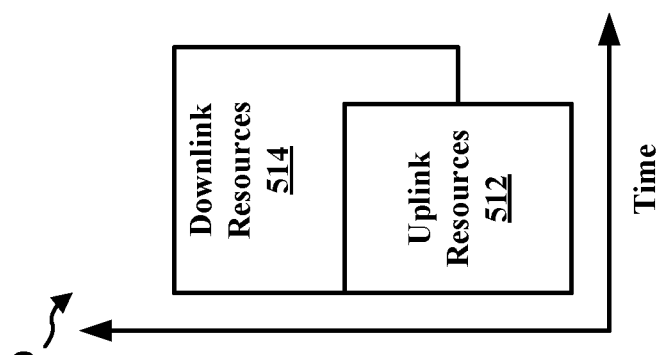
FIG. 5B depicts a timeline illustrating a partial overlap of a same in-band full-duplex resource, in accordance with various aspects of the present disclosure.
Figure 5A:
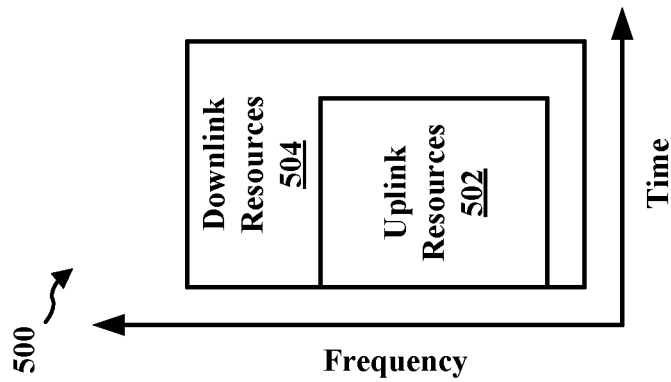
FIG. 5A depicts a timeline illustrating a full overlap of a same in-band full-duplex resource, in accordance with various aspects of the present disclosure.

A UE may implement full-duplex communication via in-band full-duplex (IBFD) or sub-band full-duplex (SBFD). When employing IBFD, the UE transmits and receives on the same time and frequency resource. That is, a downlink transmission and an uplink transmission share the same IBFD time/frequency resource. FIGS. 5A and 5B depict example timelines in which a full-duplex capable UE may employ IBFD communication. FIG. 5A depicts a timeline 500 illustrating a full overlap of a same IBFD resource. For example, uplink resources 502 (e.g., resources used by the UE for transmitting an uplink transmission) fully overlap with downlink resources 504 (e.g., resources used by the UE for receiving a downlink transmission). FIG. 5B depicts a timeline 510 illustrating a partial overlap of a same IBFD resource. For example, uplink resources 512 partially overlap with downlink resources 514.

When employing SBFD communication, the UE transmits and receives at the same time but using different frequency resources. FIG. 5C depicts an example timeline 520 in which a full-duplex capable UE may employ SBFD communication (sometimes referred to as "flexible duplex"). In some examples, uplink resources 522 and downlink resources 524 may be configured within a same time division duplex (TDD) band. As shown in FIG. 5C, the uplink resources 522 and the downlink resources 524 overlap in time, but do not overlap with respect to frequency resources. For example, the uplink resources 522 may be separated from the downlink resources 524 in the frequency domain by a guard band 526. Moreover, both of the uplink resources 522 and the downlink resources 524 of the SBFD example of FIG. 5C are within a same TDD band 530. In contrast, the uplink resources 502, 512 and/or the downlink resources 504, 514 of the IBFD examples of FIGS. 5A and 5B, respectively, may be configured across TDD bands.

As described above, when employing full-duplex communication, interference (or leakage) between signals may occur. For example, in FIG. 5C, the guard band 526 may be relatively small, such as 5 resource blocks (RBs) and, thus, leakage from the uplink resources 522 may spill through the guard band 526 to the downlink resources 524 and/or leakage from the downlink resources 524 may spill through the guard band 526 to the uplink resources 522.

In some examples, a communication device may utilize unlicensed resources (e.g., an unlicensed spectrum) for communicating. Unlicensed resources are resources that are not assigned (or licensed) to a specific radio access technology (RAT). That is, any communication device may use an unlicensed resource to communicate and an unlicensed resource may be shared with other RATs. For example, 5G NR may coexist with Wi-Fi within a 5 GHz and 6 GHz band, however, Wi-Fi channel access may be in 20 MHz units.

To enable communication using unlicensed resources, communication devices may employ listen-before-talk (LBT) before transmitting a transmission. For example, a communication device may sense a channel by detecting energy in a given frequency band (e.g., an unlicensed resource). If the detected energy is less than an occupied threshold (e.g., −3 decibels (dB)), the communication device may determine that the unlicensed resource is available for use by the communication device and the communication device may use the unlicensed resource for sending the transmission. If the detected energy is greater than the occupied threshold, the communication device may determine that the unlicensed resource is occupied (e.g., being used by another communication device) and refrain (or "back-off") from using the unlicensed resource to send the transmission. In some examples, the communication device may perform LBT on a different frequency band or may wait to perform LBT on the same frequency band to send the transmission.

Referring again to the 5G NR and Wi-Fi technologies sharing spectrum (e.g., the 5 GHz and 6 GHz band), the Wi-Fi channel access of 20 MHz may be referred to as the LBT bandwidth or the basic channel access unit. The available resource blocks (RBs) in each LBT bandwidth may be referred to as an "RB set."

FIG. 6A depicts an example sequence 600 of RB sets, as presented herein. In the illustrated example of FIG. 6A, the frequency domain is represented by a horizontal axis. As shown in FIG. 6A, the sequence 600 includes four example RB sets 602, 604, 606, 608. Each RB set corresponds to a frequency band (or unit) on which a communication device (e.g., a UE) may measure energy across to determine whether the frequency band is occupied or available for use by the communication device. The RB sets may be directed from intra-cell guard band signaling. In some examples, the RB sets 602, 604, 606, 608 may be derived separately for downlink transmissions and for uplink transmissions. As shown in FIG. 6A, each of the RB sets 602, 604, 606, 608 is separated by a guard band. For example, a first RB set 602 ("RB Set 0") and a second RB set 604 ("RB Set 1") may be separated by a first guard band 610, the second RB set 604 and a third RB set 606 ("RB Set 2") may be separated by a second guard band 612, and the third RB set 606 and a fourth RB set 608 ("RB Set 3") may be separated by a third guard band 614. The durations for each of the guard bands 610, 612, 614 may be configured via intra-cell guard band signaling ("intraCellGuardBandDL-r16" for a guard band following downlink resources and "intraCellGuardBandUL-r16" for a guard band following uplink resources). In some examples, the duration of a guard band may be zero.

When operating within an unlicensed band, a communication device may be configured with particular limitations. For example, a UE may be limited by a power spectral density (PSD) limitation and/or an occupancy of channel bandwidth (OCB) specification. For example, when a UE is operating within the 5 GHz band, the UE may be limited by a PSD limitation of 10 dBm/MHz and/or an OCB specification of 80% per 20 MHz. That is, a UE operating using unlicensed resources within the 5 GHz band may not transmit with a power-to-frequency relationship of more than 10 dBm per megahertz. Additionally, to use an RB set, a UE may be limited to using 80% or more of the RB set (e.g., the 20 MHz). Such an OCB specification prevents UEs from "occupying" an RB set by using a small portion (e.g., less than 20%) of the RB set. It may be appreciated that PUSCH and PUCCH may be configured to satisfy such constraints.

In some examples, a PRB block interlace waveform may be used for PUCCH and/or PUSCH. FIG. 6B depicts a timeline 630 including a sequence of PRB blocks. In FIG. 6B, a point A represents a start interlace index for an interlace pattern. For a 15 kHz subcarrier spacing (SCS), there may be 10 interlaces (e.g., M=10) for the bandwidth and for 30 kHz SCS, there may be five interlaces (e.g., M=5). For PUSCH, both the interlace waveform may be used for DFT-s symbols and for CP-OFDM symbols.

In some examples, a waveform may be used (e.g., in regions without an OCB specification and/or full power transmit power limitations are not provided). The interlaced waveform for common and/or dedicated PUCCH and/or PUSCH may be separately configured, but the UE may not expect the configuration to be different for a given cell. In some examples, dynamic switching of waveforms may be prevented.

FIG. 6C depicts a diagram 650 including UL resource blocks 652 configured for uplink transmissions within the second RB set 604 and the third RB set 606. As shown in FIG. 6C, the UL resource blocks 652 are configured with an interlaced pattern 660 (e.g., not contiguous). While it may be beneficial to assign the UL resource blocks 652 contiguously within an RB set (e.g., within a first portion of the second RB set 604), such a configuration may violate the PSD limitation and/or the OCB specification. For example, transmitting the UL resource blocks 652 in a contiguous manner may violate the limitation of 10 dBm per MHz.

Thus, it may be appreciated that the interlaced pattern 660 may be a solution for transmitting by a UE while also satisfying the PSD limitation and the OCB specification. The interlaced pattern 660 (sometimes referred to as an "interlaced PUSCH waveform") may be used for DFT-s waveforms and for CP-OFDM waveforms. For DFT-s waveforms, if the allocated number of resource blocks is not in a certain form, e.g., the form of $2^a3^b5^c$, the ending RBs may be dropped.

In some examples, the interlaced pattern 660 may be indicated by signaling RB assignments and RB gaps. For example, the interlaced pattern 660 may be indicated via signaling of how many RBs are assigned for an UL resource block and how many RBs are assigned for gaps between the UL resource blocks 652.

The interlaced pattern 660 may be indicated by X bits. In some examples, the interlaced pattern 660 may be indicated by a bitmap. For example, for a 30 kHz subcarrier spacing, a 5-bit bitmap may be used to indicate the possible interlace combinations. In some examples, the interlaced pattern 660 may be indicated by a start interlace index and a number of contiguous interlace indices (e.g., a resource indication value (MV)) and using remaining RIV values to indicate specific pre-defined interlace combinations. For a 15 kHz subcarrier spacing, 6-bits may be used to indicate a start interlace index and a number of contiguous RIVs and the remaining 9 RIV values may be used to indicate the specific pre-defined interlace combinations.

In some examples, Y bits may be used for RB set assignment (e.g., for DCI format 0_1). For example, the RIV format for the starting RB set and ending RB set may be used for the RB set assignment and may be assumed to be contiguous. In some examples, when two adjacent sets are assigned, the guard band between the adjacent RB sets may also be assigned.

However, with respect to downlink transmissions, the communication device (e.g., a base station) may not be limited to such constraints. Additionally, it may be appreciated that the distribution of the UL resource blocks 652 across the RB sets 604, 606 may satisfy the PSD limitation and the OCB specification for a first UE. Moreover, a second UE sensing, for example, the second RB set 604 may determine that the second RB set 604 is occupied because the energy detected across the second RB set 604 may be greater than the occupied threshold. However, as shown in FIG. 6C, there may still be resources within the second RB set 604 that are not being used by the first UE.

Full-duplex communication may enable a UE to use the unused resource blocks within an RB set (e.g., the unused resource blocks within the RB sets 604, 606) for receiving a downlink transmission. That is, an interlaced uplink waveform may waste resources that can be used for simultaneous SBFD DL transmission by a full-duplex capable UE.

Aspects disclosed herein provide an interleaved configuration of uplink transmissions and downlink transmissions in a full-duplex manner that improves spectral efficiency. For example, a base station may configure a UE with simultaneous uplink transmissions and downlink transmissions. In some examples, the uplink transmissions and the downlink transmissions may each be interlaced in the frequency domain in a configuration that satisfies sub-band full duplex operation. That is, the uplink transmissions and the downlink transmissions may be configured so that non-overlapping frequency resources are used for the respective transmissions while sharing a time resource (as shown in FIG. 5C). When providing the interleaved configuration, the base station may include an interlace assignment and an RB set assignment. For example, the interleaved configured may include an interlace assignment allocating one or more resource blocks for uplink transmission and may include an RB set assignment indicating to which RB set(s) the interlace assignment applies.

Figure 7A:
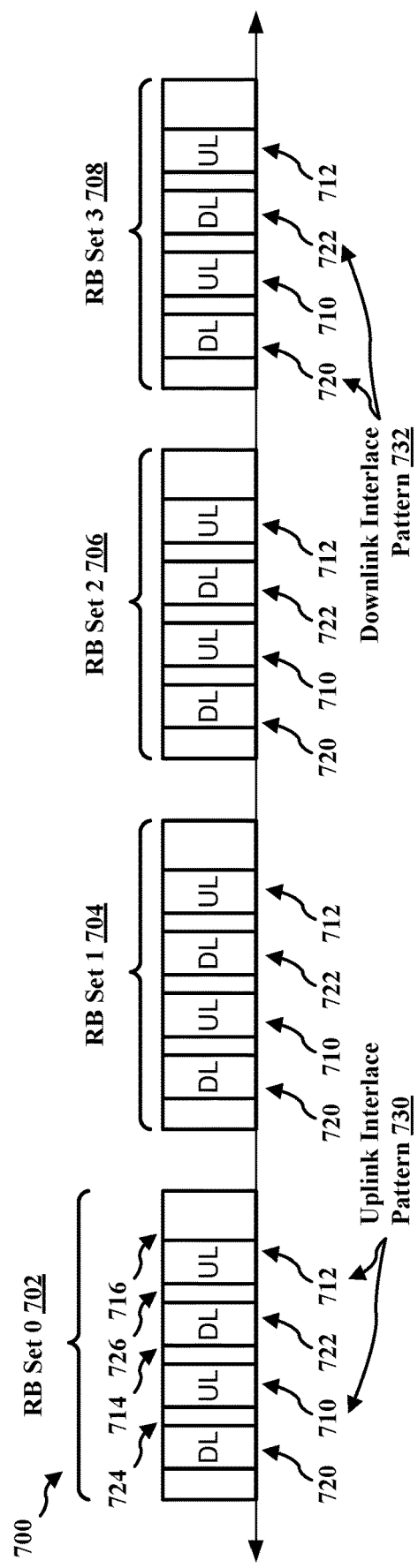
FIG. 7A depicts a sequence of RB sets configured having an interleaved configuration for uplink transmissions and downlink transmissions, in accordance with various aspects of the present disclosure.

FIG. 7A depicts a sequence 700 of RB sets configured having an interleaved configuration for uplink transmissions and downlink transmissions, as presented herein. The example sequence 700 includes four example RB sets 702, 704, 706, 708. In the illustrated example of FIG. 7A, the RB sets 702, 704, 706, 708 include uplink resources 710, 712. The uplink resources 710, 712 may include one or more contiguous resource blocks within an RB set. The uplink resources 710, 712 may correspond to the UL resource blocks 652 of FIG. 6C.

To improve the spectral efficiency of the RB sets of the sequence 700, resources unused for uplink transmissions within an RB set may be used for downlink transmissions. For example, the RB sets 702, 704, 706, 708 include downlink resources 720, 722. The downlink resources 720, 722 may be used for receiving downlink transmissions. An arrangement of the uplink resources 710, 712 within one or more RB set(s) may be referred to as an uplink interlace pattern 730. Similarly, an arrangement of the downlink resources 720, 722 within one or more RB set(s) may be referred to as a downlink interlace pattern 732.

In some examples, the base station may provide individual uplink and downlink interlace patterns. For example, for uplink transmissions, the base station may indicate a new uplink interlace pattern and signaling, or may indicate an existing uplink interlace pattern and signaling. For downlink transmissions, the base station may use a bitmap or an RIV format (e.g., a start interlace index and a number of contiguous interlace indices) to indicate the downlink interlace pattern.

In some examples, the base station may provide an uplink interlace pattern and an offset to a UE. The UE may then derive the downlink interlace pattern using the uplink interlace pattern and the offset. For example, the UE may determine, based on the offset and uplink interlace pattern, that the start of a downlink resource 722 is located after the end of a uplink resource 710 by the offset. In some examples, the offset may correspond to a quantity of resource blocks.

In some examples, the base station may provide a joint interlaced pattern of uplink transmissions and downlink transmissions. The joint interlaced pattern between uplink transmissions and downlink transmissions may be signaled jointly via RRC signaling. In some examples, the joint interlaced pattern may be signaled via a bitmap or an RIV indication (e.g., a start interlace index and a number of contiguous interlace indices).

The joint interlaced pattern of uplink transmissions and downlink transmissions may be symmetrical or asymmetrical. When the joint interlaced pattern is symmetric, then the quantity of contiguous resource blocks in the downlink direction and the uplink direction may be the same. For example, in the illustrated example of FIG. 7A, the quantity of resource blocks associated with the uplink resources 710, 712 is the same as the quantity of resource blocks associated with the downlink resources 720, 722. A symmetric distribution may be beneficial for providing less overhead signaling, but may provide less scheduling flexibility.

Figure 7B:
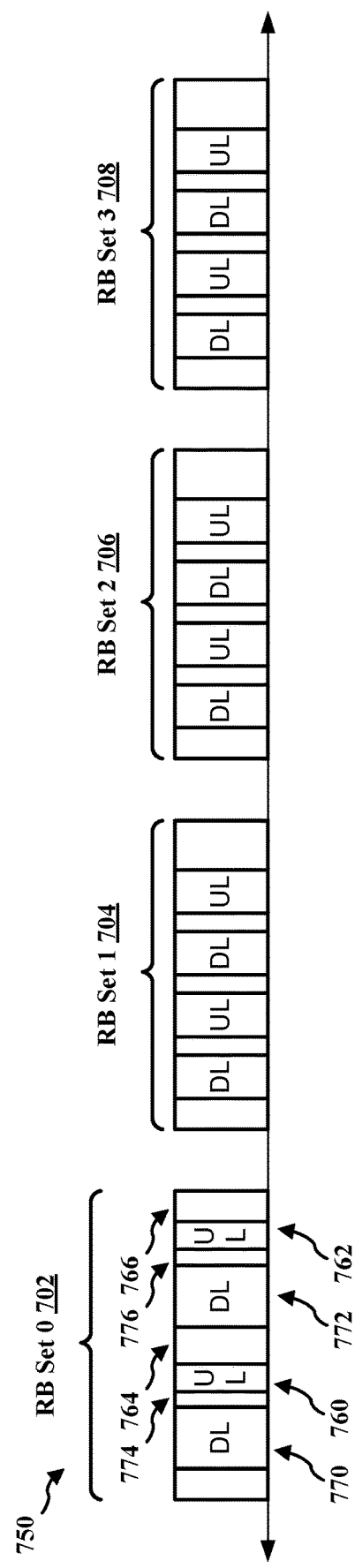
FIG. 7B depicts a sequence including an asymmetric distribution of uplink resources and downlink resources, in accordance with various aspects of the present disclosure.

When the joint interlaced pattern is asymmetric, then the quantity of contiguous resource blocks in the downlink direction and the quantity of contiguous resource blocks in the uplink direction are different. FIG. 7B depicts a sequence 750 including an asymmetric distribution of uplink resources and downlink resources. For example, the sequence 750 includes uplink resources 760, 762 and downlink resources 770, 772. As shown in FIG. 7B, a quantity of contiguous resource blocks associated with the downlink resources 770, 772 is greater than a quantity of contiguous resource blocks associated with the uplink resources 760, 762. An asymmetric distribution may be beneficial for providing more scheduling flexibility, but may use additional overhead signaling.

In some examples, when the base station provides the joint interlaced pattern to the UE, the base station may provide one or more parameters of the joint interlaced pattern via RRC signaling. The base station may additionally or alternatively provide one or more parameters of the joint interlaced pattern via a MAC—control element (MAC-CE) and/or DCI. For example, the base station may configure the start and/or quantity of resource blocks of the uplink resources or downlink resources via RRC signaling. The base station may additionally configure gap durations that follow the uplink resources or the downlink resources via a MAC-CE and/or DCI.

In the illustrated example of FIG. 7A, each of the resources 710, 712, 720, 722 is followed by a gap duration. For example, a first uplink resource 710 is followed by a first uplink gap duration 714, a second uplink resource 712 is followed by a second uplink gap duration 716, a first downlink resource 720 is followed by a first gap duration 724, and a second downlink resource 722 is followed by a second gap duration 726. The gap durations 714, 716, 724, 726 may be configured via RRC signaling. In some examples, the gap durations 714, 716, 724, 726 may be configured via a bitmap or an RIV indication.

In some examples, the uplink gap durations 714, 716 may be the same duration as the downlink gap durations 724, 726. For example, the gap durations 714, 716, 724, 726 may be set to a same duration (e.g., 5 resource blocks), as shown in FIG. 7A.

In some examples, the uplink gap durations may be a different duration than the downlink gap durations. For example, in FIG. 7B, downlink gap durations 774, 776 following the downlink resources 770, 772 may be shorter than uplink gap durations 764, 766 following the uplink resources 760, 762.

In some examples, one of the uplink gap durations or the downlink gap durations may be set to zero. For example, FIG. 8A depicts a sequence 800 including downlink gap durations with a duration of zero following downlink resources 802, 804. The sequence 800 also includes uplink gap durations 810, 812 following uplink resources 814, 816. As shown in FIG. 8A, the uplink gap durations 810, 812 are set to a non-zero value.

FIG. 8B depicts a sequence 820 including uplink gap durations with a duration of zero following uplink resources 822, 824. The sequence 820 also includes downlink gap durations 830, 832 following downlink resources 834, 836. As shown in FIG. 8B, the downlink gap durations 830, 832 are set to a non-zero value.

In some examples, the uplink gap durations and the downlink gap durations may each be set to zero. For example, FIG. 8C depicts a sequence 850 including a joint interlaced pattern of uplink transmissions using uplink resources 860, 862 and downlink transmissions using downlink resources 870, 872. As shown in FIG. 8C, the uplink resource 860 is followed by an uplink gap duration set to zero and the downlink resources 870, 872 are followed by downlink gap durations set to zero.

Figure 9:
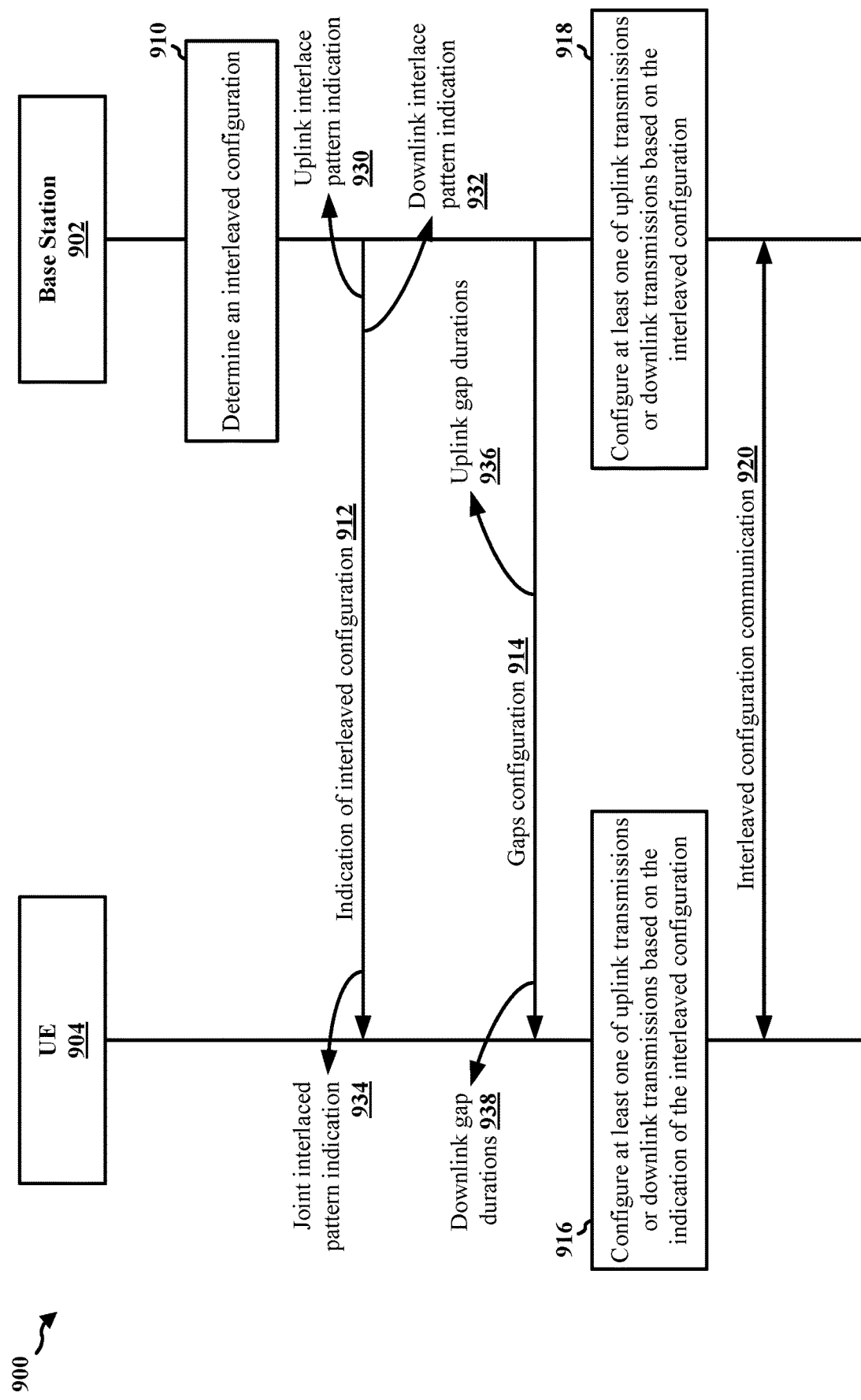
FIG. 9 is an example communication flow between a base station and a UE, in accordance with the teachings disclosed herein.

FIG. 9 illustrates an example communication flow 900 between a base station 902 and a UE 904, as presented herein. In the illustrated example, the communication flow 900 facilitates the UE 904 applying an interleaved configuration for uplink transmissions and downlink transmissions when communicating using full-duplex. Aspects of the base station 902 may be implemented by the base station 102/180 of FIG. 1 and/or the base station 310 of FIG. 3 Aspects of the UE 904 may be implemented by the UE 104 of FIG. 1 and/or the UE 350 of FIG. 3. Although not shown in the illustrated example of FIG. 9, it may be appreciated that in additional or alternative examples, the base station 902 may be in communication with one or more other base stations or UEs, and/or the UE 904 may be in communication with one or more other base stations or UEs.

At 910, the base station 902 may determine an interleaved configuration for full duplex communication with the UE 904. For example, the interleaved configuration may include independent uplink interlace patterns and downlink interlace patterns. In some examples, the interleaved configuration may include an uplink interlace pattern and an offset. In some examples, the interleaved configuration may include a joint interlaced pattern. The interleaved configuration may include uplink gap durations following uplink transmissions (e.g., the uplink gap durations 714, 716 following the uplink resources 710, 712 of FIG. 7A) and may include downlink gap durations following downlink transmissions (e.g., the downlink gap durations 724, 726 following the downlink resources 720, 722 of FIG. 7A). In some examples, the uplink gap durations and the downlink gap durations may be the same duration (e.g., as shown in FIG. 7A). In some examples, the uplink gap durations and the downlink gap durations may be different durations (e.g., as shown in FIG. 7B). In some examples, one of the uplink gap durations or the downlink gap durations may be set to zero (e.g., as shown in FIGS. 8A and 8B). In some examples, the uplink gap durations and the downlink gap durations may be set to zero (e.g., as shown in FIG. 8C).

The base station 902 may transmit an indication of the interleaved configuration 912 that is received by the UE 904. The indication of the interleaved configuration 912 may include the independent uplink interlace pattern and downlink interlace pattern. For example, the indication of the interleaved configuration 912 may include an uplink interlace pattern indication 930 and a downlink interlace pattern indication 932. The indication of the interleaved configuration 912 may include the uplink interlace pattern and the offset. The indication of the interleaved configuration 912 may include the joint interlaced pattern. For example, the indication of the interleaved configuration 912 may include a joint interlaced pattern indication 934.

The base station 902 may transmit the indication of the interleaved configuration 912 using RRC signaling, a MAC-CE, and/or DCI. The indication of the interleaved configuration 912 may include the interlace patterns, such as the uplink interlace pattern indication 930, the downlink interlace pattern indication 932, and/or the joint interlaced pattern indication 934.

In some examples, the interleaved configuration may include additional or alternative parameters. For example, the base station 902 may transmit a gaps configuration 914 that includes uplink gap durations 936 and/or downlink gap durations 938. In some examples, the base station 902 may transmit the interlace patterns (e.g., the uplink interlace pattern indication 930, the downlink interlace pattern indication 932, and/or the joint interlaced pattern indication 934) via RRC signaling and configure the downlink gap durations 938 and/or the uplink gap durations 936 using a MAC-CE and/or DCI.

At 916, the UE 904 configures at least one of uplink transmissions or downlink transmissions based on the indication of the interleaved configuration 912, which may include the gaps configuration 914. For example, the indication of the interleaved configuration 912 may include an independent uplink interlace pattern (e.g., the uplink interlace pattern indication 930) and downlink interlace pattern (e.g., the downlink interlace pattern indication 932) or may include a joint interlaced pattern (e.g., the joint interlaced pattern indication 934). In some examples, the indication of the interleaved configuration 912 may include an uplink interlace pattern and an offset. In such examples, the UE 904 may derive the downlink interlace pattern based on the uplink interlace pattern and the offset. The UE 904 may schedule uplink transmissions using uplink resources corresponding to the uplink interlace pattern and may schedule downlink transmissions using downlink resources corresponding to the downlink interlace pattern.

In some examples, the base station 902 may configure, at 918, at least one of uplink transmissions or downlink transmissions based on the interleaved configuration. For example, the base station 902 may configure downlink resources to transmit downlink transmissions to the UE 904 based on the downlink interlace pattern and may configure uplink resources for receiving uplink transmissions from the base station 902 based on the uplink interlace pattern.

The UE 904 and the base station 902 may transmit communications 920 via the interleaved configuration. For example, the UE 904 may use the downlink interlace pattern to receive downlink transmissions from the base station 902 and use the uplink interlace pattern to transmit uplink transmissions to the base station 902. In a similar manner, the base station may use the uplink interlace pattern to receive uplink transmissions form the UE 904 and use the downlink interlace pattern to transmit downlink transmissions to the UE 904. In some examples the communications 920 may be associated with unlicensed resources.

Figure 10:
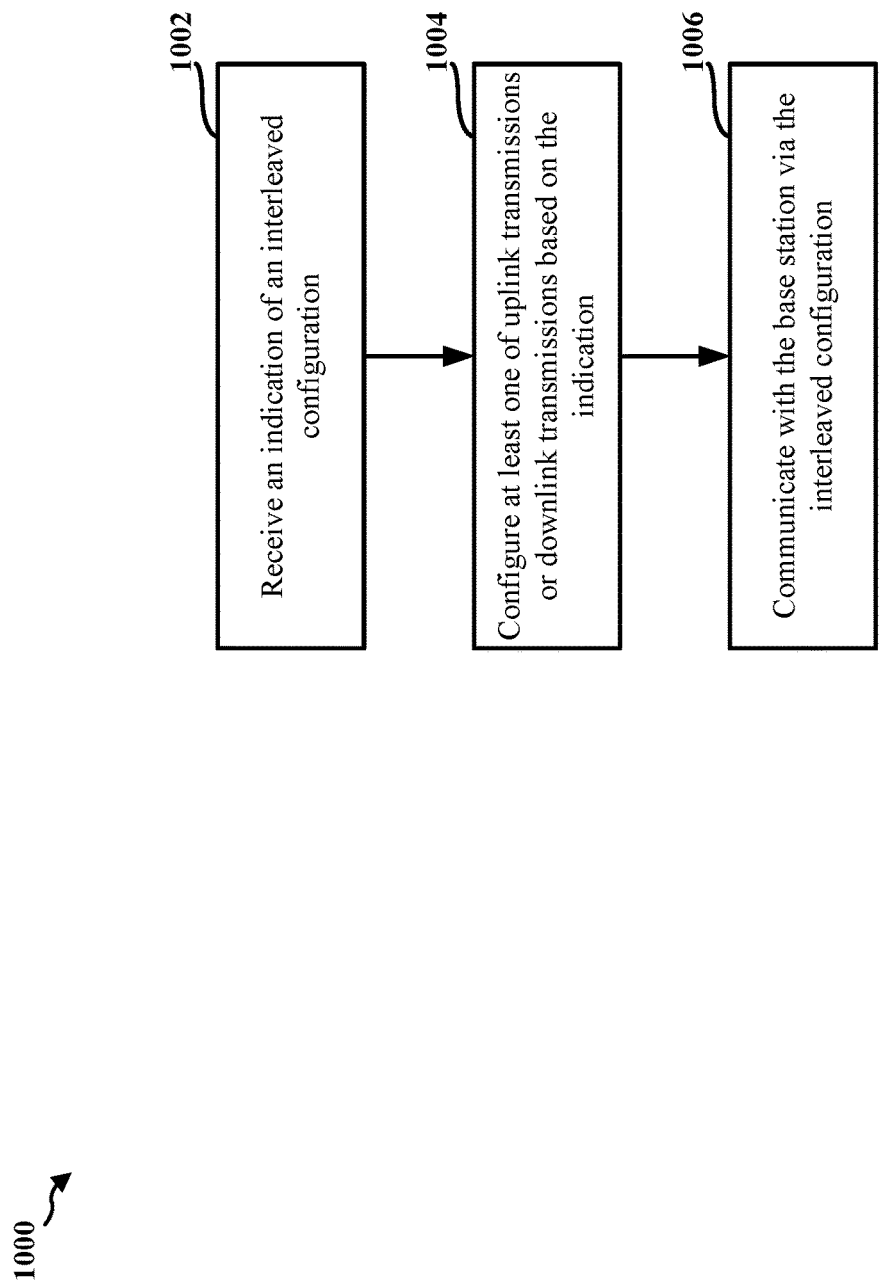
FIG. 10 is a flowchart of a method of wireless communication at a UE, in accordance with the teachings disclosed herein.

FIG. 10 is a flowchart 1000 of a method of wireless communication. The method may be performed by a UE (e.g., the UE 104, the UE 350, and/or an apparatus 1202 of FIG. 12). The method may facilitate improving communications by configuring the UE to use an interleaved design for at least one of uplink transmissions or downlink transmissions in a full-duplex manner that improves spectral efficiency.

At 1002, the UE receives, from a base station, an indication of an interleaved configuration, the interleaved configuration corresponding to a full-duplex configuration including a first gap duration following a downlink transmission and a second gap duration following an uplink transmission, as described in connection with the interleaved configuration 912 of FIG. 9. The receiving of the indication of the interleaved configuration, at 1002, may be performed by an indication receiving component 1240 of the apparatus 1202 of FIG. 12.

In some examples, the indication of the interleaved configuration may configure an uplink interlace pattern and a downlink interlace pattern that occupy separate frequency resources of a resource block set, as described in connection with the example of FIG. 5C.

In some examples, the indication of the interleaved configuration may indicate the uplink interlace pattern and the downlink interlace pattern, as described in connection with the uplink interlace pattern indication 930 and the downlink interlace pattern indication 932. In some examples, the downlink interlace pattern may be signaled using a bitmap. In some examples, the downlink interlace pattern may be signaled using a start interlace index and a quantity of contiguous interlace indices. In some examples, the indication of the interleaved configuration may include the uplink interlace pattern and an offset. In such examples, the UE may derive the downlink interlace pattern based on the uplink interlace pattern and the offset.

At 1004, the UE configures at least one of uplink transmissions or downlink transmissions based on the indication, as described in connection with 916 of FIG. 9. The configuring of the at least one of the uplink transmissions or the downlink transmissions, at 1004, may be performed by a transmissions configuration component 1242 of the apparatus 1202 of FIG. 12.

At 1006, the UE communicates with the base station via the interleaved configuration, communications with the base station including at least one of the uplink transmissions or the downlink transmissions, as described in connection with 920 of FIG. 9. In some examples, communicating with the base station may be associated with unlicensed resources. The communicating with the base station via the interleaved configuration, at 1006, may be performed by a transmissions communication component 1244 of the apparatus 1202 of FIG. 12.

Figure 11:
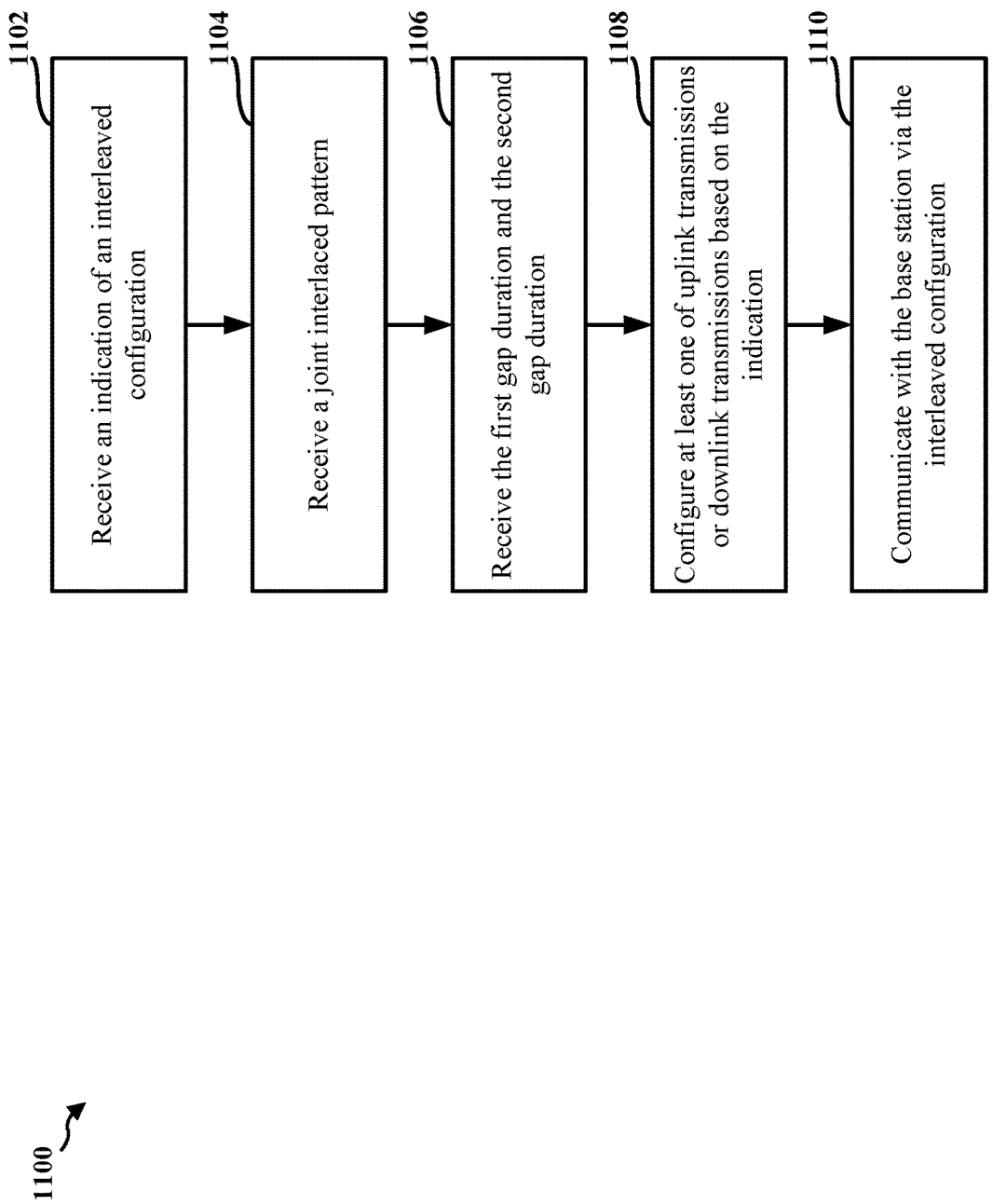
FIG. 11 is a flowchart of a method of wireless communication at a UE, in accordance with the teachings disclosed herein.

FIG. 11 is a flowchart 1100 of a method of wireless communication. The method may be performed by a UE (e.g., the UE 104, the UE 350, and/or an apparatus 1202 of FIG. 12). The method may facilitate improving communications by configuring the UE to use an interleaved design for at least one of uplink transmissions or downlink transmissions in a full-duplex manner that improves spectral efficiency.

At 1102, the UE receives, from a base station, an indication of an interleaved configuration, the interleaved configuration corresponding to a full-duplex configuration including a first gap duration following a downlink transmission and a second gap duration following an uplink transmission, as described in connection with the interleaved configuration 912 of FIG. 9. The receiving of the indication of the interleaved configuration, at 1102, may be performed by an indication receiving component 1240 of the apparatus 1202 of FIG. 12.

In some examples, the indication of the interleaved configuration may configure an uplink interlace pattern and a downlink interlace pattern that occupy separate frequency resources of a resource block set, as described in connection with the example of FIG. 5C.

In some examples, the indication of the interleaved configuration may indicate the uplink interlace pattern and the downlink interlace pattern, as described in connection with the uplink interlace pattern indication 930 and the downlink interlace pattern indication 932. In some examples, the downlink interlace pattern may be signaled using a bitmap. In some examples, the downlink interlace pattern may be signaled using a start interlace index and a quantity of contiguous interlace indices. In some examples, the indication of the interleaved configuration may include the uplink interlace pattern and an offset. In such examples, the UE may derive the downlink interlace pattern based on the uplink interlace pattern and the offset.

In some examples, the indication of the interleaved configuration may include a joint interlaced pattern. For example, at 1104, the UE may receive a joint interlaced pattern of the uplink transmissions and the downlink transmissions, as described in connection with the joint interlaced pattern indication 934 of FIG. 9. In some examples, the UE may receive the joint interlaced pattern via RRC signaling. In some examples, the UE may receive the joint interlaced pattern via a bitmap or a RIV indication. The receiving of the joint interlaced pattern, at 1104, may be performed by a pattern receiving component 1246 of the apparatus 1202 of FIG. 12.

In some examples, the uplink transmissions of the joint interlaced pattern and the downlink transmissions of the joint interlaced pattern each include a same quantity of contiguous resource blocks, as described in connection with the example of FIG. 7A.

In some examples, the uplink transmissions of the joint interlaced pattern and the downlink transmissions of the joint interlaced pattern each include different respective quantities of contiguous resource blocks, as described in connection with the example of FIG. 7B.

In some example, the UE may receive, at 1106, the first gap duration and the second gap duration, as described in connection with the gaps configuration 914 of FIG. 9. The UE may receive the first gap duration and the second gap duration via RRC signaling, a MAC-CE, and/or DCI. In some examples, the UE may receive the first gap duration and the second gap duration via a bitmap or a RIV indication. The receiving of the first gap duration and the second gap duration, at 1106, may be performed by a gap duration component 1248 of the apparatus 1202 of FIG. 12.

In some examples, the first gap duration and the second gap duration are different durations. In some examples, the first gap duration and the second gap duration are equal durations. In some examples, one of the first gap duration or the second gap duration is set to a duration of zero. In some examples, the first gap duration and the second gap duration are each set to a duration of zero.

At 1108, the UE configures at least one of uplink transmissions or downlink transmissions based on the indication, as described in connection with 916 of FIG. 9. The configuring of the at least one of the uplink transmissions or the downlink transmissions, at 1108, may be performed by a transmissions configuration component 1242 of the apparatus 1202 of FIG. 12.

At 1110, the UE communicates with the base station via the interleaved configuration, communications with the base station including at least one of the uplink transmissions or the downlink transmissions, as described in connection with 920 of FIG. 9. In some examples, communicating with the base station may be associated with unlicensed resources. The communicating with the base station via the interleaved configuration, at 1110, may be performed by a transmissions communication component 1244 of the apparatus 1202 of FIG. 12.

Figure 12:
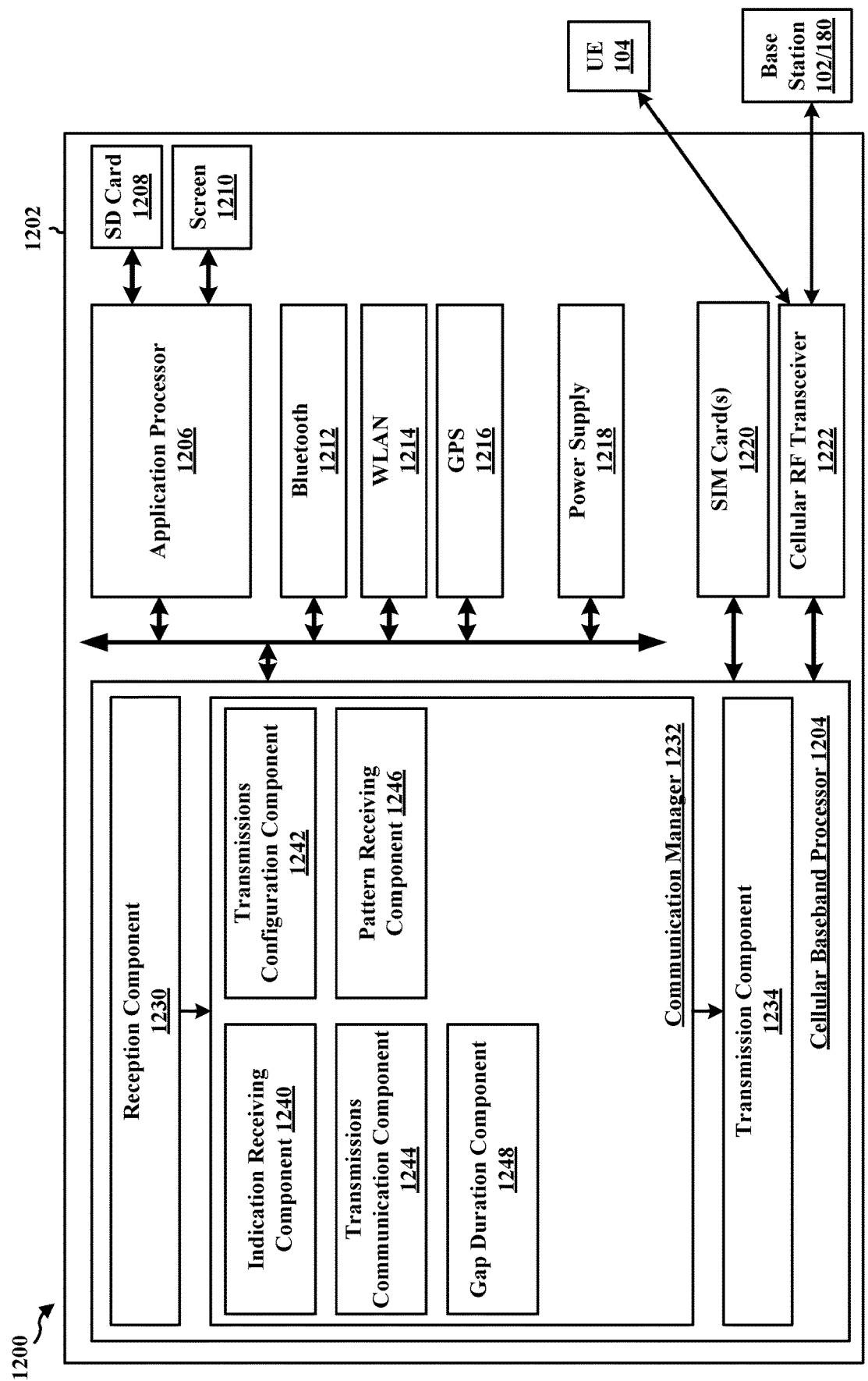
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the cellular baseband processor 1204, and in another configuration, the apparatus 1202 may be the entire UE (e.g., see the UE 350 of FIG. 3) and include the additional modules of the apparatus 1202.

The communication manager 1232 includes an indication receiving component 1240 that is configured to receive an indication of an interleaved configuration, for example, as described in connection with 1002 of FIG. 10 and/or 1102 of FIG. 11.

The communication manager 1232 also includes a transmissions configuration component 1242 that is configured to configure at least one of uplink transmissions or downlink transmissions based on the indication, for example, as described in connection with 1004 of FIG. 10 and/or 1108 of FIG. 11.

The communication manager 1232 also includes a transmissions communication component 1244 that is configured to communicate with the base station via the interleaved configuration, for example, as described in connection with 1006 of FIG. 10 and/or 1110 of FIG. 11.

The communication manager 1232 also includes a pattern receiving component 1246 that is configured to receive a joint interlaced pattern, for example, as described in connection with 1104 of FIG. 11.

The communication manager 1232 also includes a gap duration component 1248 that is configured to receive the first gap duration and the second gap duration, for example, as described in connection with 1106 of FIG. 11.

The apparatus may include additional components that perform each of the blocks of the algorithm in the flowcharts of FIGS. 10 and/or 11. As such, each block in the flowcharts of FIGS. 10 and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from a base station, an indication of an interleaved configuration, the interleaved configuration corresponding to a full-duplex configuration including a first gap duration following a downlink transmission and a second gap duration following an uplink transmission. The example apparatus 1202 also includes means for configuring at least one of uplink transmissions or downlink transmissions based on the indication. The example apparatus 1202 also includes means for communicating with the base station via the interleaved configuration, communications with the base station including at least one of the uplink transmissions or the downlink transmissions.

In another configuration, the example apparatus 1202 also includes means for receiving a joint interlaced pattern.

In another configuration, the example apparatus 1202 also includes means for receiving the first gap duration and the second gap duration.

The means may be one or more of the components of the apparatus 1202 configured to perform the functions recited by the means. As described supra, the apparatus 1202 may include the TX processor 368, the RX processor 356, and the controller/processor 359. As such, in one configuration, the means may be the TX processor 368, the RX processor 356, and the controller/processor 359 configured to perform the functions recited by the means.

Figure 13:
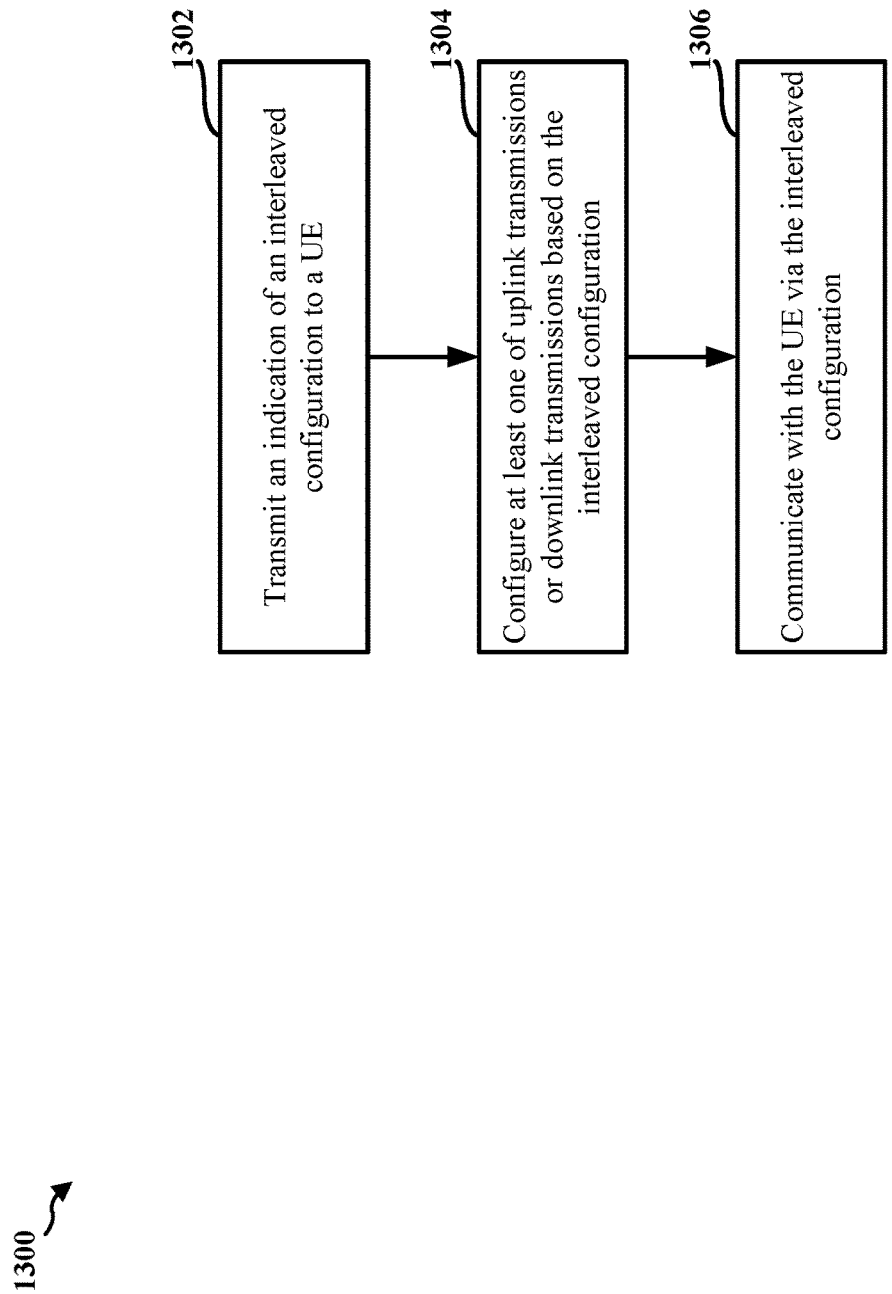
FIG. 13 is a flowchart of a method of wireless communication at a base station, in accordance with the teachings disclosed herein.

FIG. 13 is a flowchart 1300 of a method of wireless communication. The method may be performed by a base station (e.g., the base station 102/180, the base station 310, and/or an apparatus 1502 of FIG. 15). The method may facilitate improving communications with a UE by configuring the UE to use an interleaved design for at least one of uplink transmissions or downlink transmissions in a full-duplex manner that improves spectral efficiency.

At 1302, the base station transmits, to a UE, an indication of an interleaved configuration, the interleaved configuration corresponding to a full-duplex configuration including a first gap duration following a downlink transmission and a second gap duration following an uplink transmission, as described in connection with the interleaved configuration 912 of FIG. 9. The transmitting of the indication of the interleaved configuration, at 1302, may be performed by an indication transmitting component 1540 of the apparatus 1502 of FIG. 15.

In some examples, the indication of the interleaved configuration may configure an uplink interlace pattern and a downlink interlace pattern that occupy separate frequency resources of a resource block set, as described in connection with the example of FIG. 5C.

In some examples, the indication of the interleaved configuration may indicate the uplink interlace pattern and the downlink interlace pattern, as described in connection with the uplink interlace pattern indication 930 and the downlink interlace pattern indication 932. In some examples, the downlink interlace pattern may be signaled using a bitmap. In some examples, the downlink interlace pattern may be signaled using a start interlace index and a quantity of contiguous interlace indices. In some examples, the indication of the interleaved configuration may include the uplink interlace pattern and an offset.

At 1304, the base station configures at least one of uplink transmissions or downlink transmissions based on the interleaved configuration, as described in connection with 918 of FIG. 9. The configuring of the at least one of the uplink transmissions or the downlink transmissions, at 1304, may be performed by a transmissions configuration component 1542 of the apparatus 1502 of FIG. 15.

At 1306, the base station communicates with the UE via the interleaved configuration, communications with the UE including at least one of the uplink transmissions or the downlink transmissions, as described in connection with 920 of FIG. 9. In some examples, communicating with the base station may be associated with unlicensed resources. The communicating with the UE via the interleaved configuration, at 1306, may be performed by a transmissions communication component 1544 of the apparatus 1502 of FIG. 15.

Figure 14:
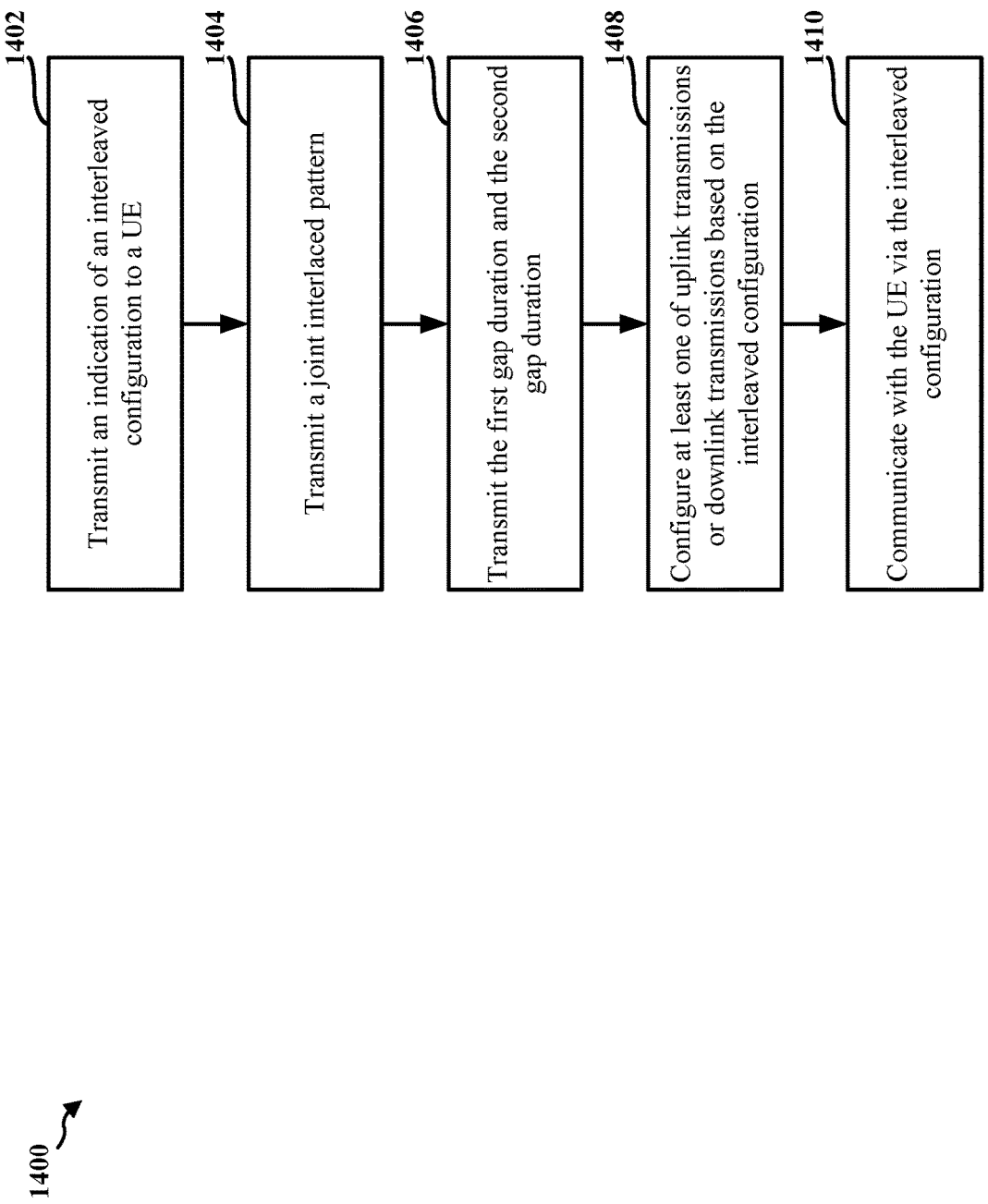
FIG. 14 is a flowchart of a method of wireless communication at a base station, in accordance with the teachings disclosed herein.

FIG. 14 is a flowchart 1400 of a method of wireless communication. The method may be performed by a base station (e.g., the base station 102/180, the base station 310, and/or an apparatus 1502 of FIG. 15). The method may facilitate improving communications with a UE by configuring the UE to use an interleaved design for at least one of uplink transmissions or downlink transmissions in a full-duplex manner that improves spectral efficiency.

At 1402, the base station transmits, to a UE, an indication of an interleaved configuration, the interleaved configuration corresponding to a full-duplex configuration including a first gap duration following a downlink transmission and a second gap duration following an uplink transmission, as described in connection with the interleaved configuration 912 of FIG. 9. The transmitting of the indication of the interleaved configuration, at 1402, may be performed by an indication transmitting component 1540 of the apparatus 1502 of FIG. 15.

In some examples, the indication of the interleaved configuration may configure an uplink interlace pattern and a downlink interlace pattern that occupy separate frequency resources of a resource block set, as described in connection with the example of FIG. 5C.

In some examples, the indication of the interleaved configuration may indicate the uplink interlace pattern and the downlink interlace pattern, as described in connection with the uplink interlace pattern indication 930 and the downlink interlace pattern indication 932. In some examples, the downlink interlace pattern may be signaled using a bitmap. In some examples, the downlink interlace pattern may be signaled using a start interlace index and a quantity of contiguous interlace indices. In some examples, the indication of the interleaved configuration may include the uplink interlace pattern and an offset.

In some examples, the indication of the interleaved configuration may include a joint interlaced pattern. For example, at 1404, the base station may transmit a joint interlaced pattern of the uplink transmissions and the downlink transmissions, as described in connection with the joint interlaced pattern indication 934 of FIG. 9. In some examples, the base station may transmit the joint interlaced pattern via RRC signaling. In some examples, the base station may transmit the joint interlaced pattern via a bitmap or a RIV indication. The transmitting of the joint interlaced pattern, at 1404, may be performed by a pattern transmitting component 1546 of the apparatus 1502 of FIG. 15.

In some examples, the uplink transmissions of the joint interlaced pattern and the downlink transmissions of the joint interlaced pattern each include a same quantity of contiguous resource blocks, as described in connection with the example of FIG. 7A.

In some examples, the uplink transmissions of the joint interlaced pattern and the downlink transmissions of the joint interlaced pattern each include different respective quantities of contiguous resource blocks, as described in connection with the example of FIG. 7B.

In some example, the base station may transmit, at 1406, the first gap duration and the second gap duration, as described in connection with the gaps configuration 914 of FIG. 9. The base station may transmit the first gap duration and the second gap duration via RRC signaling, a MAC-CE, and/or DCI. In some examples, the base station may receive the first gap duration and the second gap duration via a bitmap or a MV indication. The transmitting of the first gap duration and the second gap duration, at 1406, may be performed by a gap duration component 1548 of the apparatus 1502 of FIG. 15.

In some examples, the first gap duration and the second gap duration are different durations. In some examples, the first gap duration and the second gap duration are equal durations. In some examples, one of the first gap duration or the second gap duration is set to a duration of zero. In some examples, the first gap duration and the second gap duration are each set to a duration of zero.

At 1408, the base station configures at least one of uplink transmissions or downlink transmissions based on the interleaved configuration, as described in connection with 918 of FIG. 9. The configuring of the at least one of the uplink transmissions or the downlink transmissions, at 1408, may be performed by a transmissions configuration component 1542 of the apparatus 1502 of FIG. 15.

At 1410, the base station communicates with the UE via the interleaved configuration, communications with the UE including at least one of the uplink transmissions or the downlink transmissions, as described in connection with 920 of FIG. 9. In some examples, communicating with the base station may be associated with unlicensed resources. The communicating with the UE via the interleaved configuration, at 1410, may be performed by a transmissions communication component 1544 of the apparatus 1502 of FIG. 15.

Figure 15:
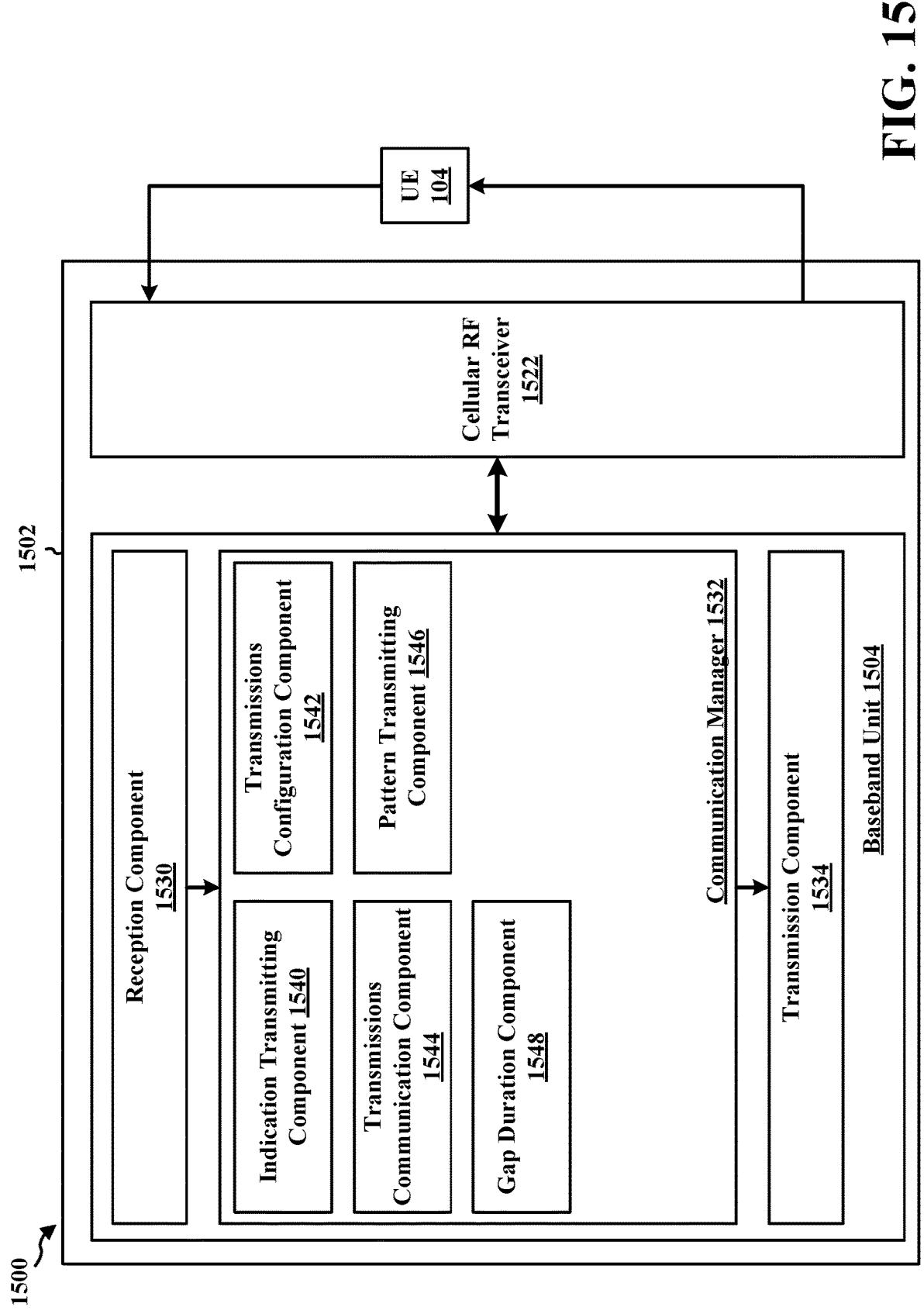
FIG. 15 is a diagram illustrating an example of a hardware implementation for an example apparatus, in accordance with the teachings disclosed herein.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes an indication transmitting component 1540 that is configured to transmit an indication of an interleaved configuration to a UE, for example, as described in connection with 1302 of FIG. 13 and/or 1402 of FIG. 14.

The communication manager 1532 also includes a transmissions configuration component 1542 that is configured to configure at least one of uplink transmissions or downlink transmissions based on the interleaved configuration, for example, as described in connection with 1304 of FIG. 13 and/or 1408 of FIG. 14.

The communication manager 1532 also includes a transmissions communication component 1544 that is configured to communicate with the UE via the interleaved configuration, for example, as described in connection with 1306 of FIG. 13 and/or 1410 of FIG. 14.

The communication manager 1532 also includes a pattern transmitting component 1546 that is configured to transmit a joint interlaced pattern, for example, as described in connection with 1404 of FIG. 14.

The communication manager 1532 also includes a gap duration component 1548 that is configured to transmit the first gap duration and the second gap duration, for example, as described in connection with 1406 of FIG. 14.

The apparatus may include additional components that perform each of the blocks of the algorithm in the flowcharts of FIGS. 13 and/or 14. As such, each block in the flowcharts of FIGS. 13 and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to a UE, an indication of an interleaved configuration, the interleaved configuration corresponding to a full-duplex configuration including a first gap duration following a downlink transmission and a second gap duration following an uplink transmission. The example apparatus 1502 also includes means for configuring at least one of uplink transmissions or downlink transmissions based on the interleaved configuration. The example apparatus 1502 also includes means for communicating with the UE via the interleaved configuration, communications with the UE including at least one of the uplink transmissions or the downlink transmissions.

In another configuration, the example apparatus 1502 also includes means for transmitting a joint interlaced pattern.

In another configuration, the example apparatus 1502 also includes means for transmitting the first gap duration and the second gap duration.

The means may be one or more of the components of the apparatus 1502 configured to perform the functions recited by the means. As described supra, the apparatus 1502 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, an indication of an interleaved configuration, the interleaved configuration corresponding to a full-duplex configuration including a first gap duration following a downlink transmission and a second gap duration following an uplink transmission; configure at least one of uplink transmissions or downlink transmissions based on the indication; and communicate with the base station via the interleaved configuration, communications with the base station including at least one of the uplink transmissions or the downlink transmissions.

Aspect 2 is the apparatus of aspect 1, further including that the communications with the base station via the interleaved configuration are associated with unlicensed resources.

Aspect 3 is the apparatus of any of aspects 1 and 2, further including that the indication of the interleaved configuration configures an uplink interlace pattern and a downlink interlace pattern that occupy separate frequency resources of a resource block set.

Aspect 4 is the apparatus of any of aspects 1 to 3, further including that the indication of the interleaved configuration indicates the uplink interlace pattern and the downlink interlace pattern.

Aspect 5 is the apparatus of any of aspects 1 to 3, further including that the downlink interlace pattern is indicated using a bitmap or is indicated using a start interlace index and a quantity of contiguous interlace indices.

Aspect 6 is the apparatus of any of aspects 1 to 3, further including that the indication of the interleaved configuration includes the uplink interlace pattern and an offset, and the downlink interlace pattern is derived based on the uplink interlace pattern and the offset.

Aspect 7 is the apparatus of any of aspects 1 to 3, further including that the indication of the interleaved configuration includes a joint interlaced pattern of the uplink transmissions and the downlink transmissions.

Aspect 8 is the apparatus of any of aspects 1 to 7, further including that the at least one processor is further configured to receive the joint interlaced pattern via a bitmap or a RIV indication.

Aspect 9 is the apparatus of any of aspects 1 to 7, further including that the at least one processor is further configured to receive the first gap duration and the second gap duration via a bitmap or a RIV indication.

Aspect 10 is the apparatus of any of aspects 1 to 9, further including a transceiver coupled to the at least one processor.

Aspect 11 is a method of wireless communication for implementing any of aspects 1 to 10.

Aspect 12 is an apparatus for wireless communication including means for implementing any of aspects 1 to 10.

Aspect 13 is a non-transitory computer-readable storage medium storing computer executable code, where the code, when executed, causes a processor to implement any of aspects 1 to 10.

Aspect 14 is an apparatus for wireless communication at a base station including at least one processor coupled to a memory and configured to transmit, to a UE, an indication of an interleaved configuration, the interleaved configuration corresponding to a full-duplex configuration including a first gap duration following a downlink transmission and a second gap duration following an uplink transmission; configure at least one of uplink transmissions or downlink transmissions based on the interleaved configuration; and communicate with the UE via the interleaved configuration, communications with the UE including at least one of the uplink transmissions or the downlink transmissions.

Aspect 15 is the apparatus of aspect 14, further including that the communications with the UE via the interleaved configuration are associated with unlicensed resources.

Aspect 16 is the apparatus of any of aspects 14 and 15, further including that the indication of the interleaved configuration configures an uplink interlace pattern and a downlink interlace pattern that occupy separate frequency resources of a resource block set.

Aspect 17 is the apparatus of any of aspects 14 to 16, further including that the indication of the interleaved configuration indicates the uplink interlace pattern and the downlink interlace pattern.

Aspect 18 is the apparatus of any of aspects 14 to 16, further including that the at least one processor is configured to indicate the downlink interlace pattern using a bitmap or using a start interlace index and a quantity of contiguous interlace indices.

Aspect 19 is the apparatus of any of aspects 14 to 16, further including that the indication of the interleaved configuration includes a joint interlaced pattern of the uplink transmissions and the downlink transmissions.

Aspect 20 is the apparatus of any of aspects 14 to 19, further including that the at least one processor is configured to transmit the joint interlaced pattern via a bitmap or a RIV indication.

Aspect 21 is the apparatus of any of aspects 14 to 20, further including that the at least one processor is configured to transmit the first gap duration and the second gap duration via a bitmap or a RIV indication.

Aspect 22 is the apparatus of any of aspects 14 to 21, further including a transceiver coupled to the at least one processor.

Aspect 23 is a method of wireless communication for implementing any of aspects 14 to 22.

Aspect 24 is an apparatus for wireless communication including means for implementing any of aspects 14 to 22.

Aspect 25 is a non-transitory computer-readable storage medium storing computer executable code, where the code, when executed, causes a processor to implement any of aspects 14 to 22.

What is claimed is:

1. A user equipment (UE) for wireless communication, comprising:
   a memory; and
   at least one processor coupled to the memory, wherein the at least one processor is configured to:
      receive, from a base station, information indicative of an interleaved configuration corresponding to a full-duplex configuration associated with a set of uplink resources for the UE and a set of downlink resources for the UE, wherein the set of uplink resources are interleaved in frequency with the set of downlink resources; and
      communicate with the base station through a set of uplink transmissions on a subset of the set of uplink resources and a set of downlink transmissions on a subset of the set of downlink resources, wherein the set of uplink transmissions overlaps in time and is interleaved in frequency with the set of downlink transmissions based on the interleaved configuration, and wherein at least one uplink transmission of the set of uplink transmissions and at least one downlink transmission of the set of downlink transmissions is included in a resource block set.

2. The UE of claim 1, wherein the communication with the base station is associated with unlicensed resources.

3. The UE of claim 1, wherein the information indicative of the interleaved configuration configures an uplink interlace pattern and a downlink interlace pattern that occupy separate frequency resources of the resource block set.

4. The UE of claim 3, wherein the information indicative of the interleaved configuration indicates the uplink interlace pattern and the downlink interlace pattern.

5. The UE of claim 3, wherein the downlink interlace pattern is based on a bitmap or based on a start interlace index and a quantity of contiguous interlace indices.

6. The UE of claim 3, wherein the information indicative of the interleaved configuration includes the uplink interlace pattern and an offset, and the downlink interlace pattern is derived based on the uplink interlace pattern and the offset.

7. The UE of claim 3, wherein the information indicative of the interleaved configuration includes a joint interlaced pattern of the set of uplink resources and the set of downlink resources.

8. The UE of claim 7, wherein the at least one processor is configured to receive the joint interlaced pattern via a bitmap or a resource indication value (MV) indication.

9. The UE of claim 7, wherein the interleaved configuration comprises at least one frequency gap, the at least one frequency gap corresponding to at least one of a first frequency gap between an adjacent uplink resource block and a downlink resource block or a second frequency gap between an adjacent downlink resource block and an uplink resource block, and wherein the at least one processor is configured to receive the information indicative of the at least one frequency gap via a bitmap or a resource indication value (RIV) indication.

10. The UE of claim 1, further comprising a transceiver coupled to the at least one processor.

11. A method of wireless communication performed by a user equipment (UE), comprising:
receiving, from a base station, information indicative of an interleaved configuration corresponding to a full-duplex configuration associated with a set of uplink resources for the UE and a set of downlink resources for the UE, wherein the set of uplink resources are interleaved in frequency with the set of downlink resources; and
communicating with the base station through a set of uplink transmissions on a subset of the set of uplink resources and a set of downlink transmissions on a subset of the set of downlink resources, wherein the set of uplink transmissions overlaps in time and is interleaved in frequency with the set of downlink transmissions based on the interleaved configuration, and wherein at least one uplink transmission of the set of uplink transmissions and at least one downlink transmission of the set of downlink transmissions is included in a resource block set.

12. The method of claim 11, wherein communicating with the base station is associated with unlicensed resources.

13. The method of claim 11, wherein the information indicative of the interleaved configuration configures an uplink interlace pattern and a downlink interlace pattern that occupy separate frequency resources of the resource block set.

14. The method of claim 13, wherein the downlink interlace pattern is signaled using a bitmap or is signaled using a start interlace index and a quantity of contiguous interlace indices.

15. The method of claim 13, wherein the information indicative of the interleaved configuration includes the uplink interlace pattern and an offset, and the downlink interlace pattern is derived based on the uplink interlace pattern and the offset.

16. The method of claim 13, wherein the information indicative of the interleaved configuration includes a joint interlaced pattern of the set of uplink resources and the set of downlink resources.

17. A base station for wireless communication comprising:
a memory; and
at least one processor coupled to the memory, wherein the at least one processor is configured to:
transmit, to a user equipment (UE), information indicative of an interleaved configuration corresponding to a full-duplex configuration associated with a set of uplink resources for the UE and a set of downlink resources for the UE, wherein the set of uplink resources are interleaved in frequency with the set of downlink resources; and
communicate with the UE through a set of uplink transmissions on a subset of the set of uplink resources and a set of downlink transmissions on a subset of the set of downlink resources, wherein the set of uplink transmissions overlaps in time and is interleaved in frequency with the set of downlink transmissions based on the interleaved configuration, and wherein at least one uplink transmission of the set of uplink transmissions and at least one downlink transmission of the set of downlink transmissions is included in a resource block set.

18. The base station of claim 17, wherein the communication with the UE is associated with unlicensed resources.

19. The base station of claim 17, wherein the information indicative of the interleaved configuration configures an uplink interlace pattern and a downlink interlace pattern that occupy separate frequency resources of the resource block set.

20. The base station of claim 19, wherein the information indicative of the interleaved configuration indicates the uplink interlace pattern and the downlink interlace pattern.

21. The base station of claim 19, wherein the at least one processor is configured to indicate the downlink interlace pattern using a bitmap or using a start interlace index and a quantity of contiguous interlace indices.

22. The base station of claim 19, wherein the information indicative of the interleaved configuration includes a joint interlaced pattern of the set of uplink resources and the set of downlink resources.

23. The base station of claim 22, wherein the at least one processor is configured to transmit the joint interlaced pattern via a bitmap or a resource indication value (MV) indication.

24. The base station of claim 22, wherein the interleaved configuration comprises at least one frequency gap, the at least one frequency gap corresponding to at least one of a first frequency gap between an adjacent uplink resource block and a downlink resource block or a second frequency gap between an adjacent downlink resource block and an uplink resource block, and wherein the at least one processor is configured to transmit the information indicative of the at least one frequency gap via a bitmap or a resource indication value (MV) indication.

25. The base station of claim 17, further comprising a transceiver coupled to the at least one processor.

26. A method of wireless communication performed by a base station, comprising:
transmitting, for a user equipment (UE), information indicative of an interleaved configuration corresponding to a full-duplex configuration associated with a set of uplink resources for the UE and a set of downlink resources for the UE, wherein the set of uplink resources are interleaved in frequency with the set of downlink resources; and
communicating with the UE through a set of uplink transmissions on a subset of the set of uplink resources and a set of downlink transmissions on a subset of the set of downlink resources, wherein the set of uplink transmissions overlaps in time and is interleaved in frequency with the set of downlink transmissions based on the interleaved configuration, and wherein at least one uplink transmission of the set of uplink transmissions and at least one downlink transmission of the set of downlink transmissions is included in a resource block set.

27. The method of claim 26, wherein communicating with the UE is associated with unlicensed resources.

28. The method of claim 26, wherein the information indicative of the interleaved configuration configures an uplink interlace pattern and a downlink interlace pattern that occupy separate frequency resources of the resource block set.

29. The method of claim 28, wherein the base station indicates the downlink interlace pattern using a bitmap or using a start interlace index and a quantity of contiguous interlace indices.

30. The method of claim 28, wherein the information indicative of the interleaved configuration includes a joint interlaced pattern of the set of uplink resources and the set of downlink resources.

* * * * *